United States Patent
Yu et al.

(10) Patent No.: US 9,755,227 B2
(45) Date of Patent: Sep. 5, 2017

(54) METHOD FOR FORMING A REDUCED GRAPHENE OXIDE/METAL SULFIDE COMPOSITE AND ITS USE AS AN ANODE FOR BATTERIES

(71) Applicants: NANYANG TECHNOLOGICAL UNIVERSITY, Singapore (SG); YISSUM RESEARCH DEVELOPMENT COMPANY OF THE HEBREW UNIVERSITY OF JERUSALEM LTD, Jerusalem (IL)

(72) Inventors: Yau Wai Denis Yu, Singapore (SG); Sudip Kumar Batabyal, Singapore (SG); Ovadia Lev, Jerusalem (IL); Jenny Gun, Jerusalem (IL); Petr V. Prikhodchenko, Jerusalem (IL)

(73) Assignees: Nanyang Technological University, Singapore (SG); Yissum Research Development Company of the Hebrew University of Jerusalem Ltd., Jerusalem (IL)

( * ) Notice: Subject to any disclaimer, the term of this patent is extended or adjusted under 35 U.S.C. 154(b) by 0 days.

(21) Appl. No.: 14/646,261

(22) PCT Filed: Nov. 15, 2013

(86) PCT No.: PCT/SG2013/000488
§ 371 (c)(1),
(2) Date: May 20, 2015

(87) PCT Pub. No.: WO2014/081389
PCT Pub. Date: May 30, 2014

(65) Prior Publication Data
US 2015/0318544 A1   Nov. 5, 2015

Related U.S. Application Data

(60) Provisional application No. 61/728,572, filed on Nov. 20, 2012, provisional application No. 61/814,582, filed on Apr. 22, 2013.

(51) Int. Cl.
C01B 31/04 (2006.01)
H01B 1/04 (2006.01)
H01M 4/36 (2006.01)
H01M 10/0525 (2010.01)
H01M 10/054 (2010.01)
H01M 4/48 (2010.01)
H01M 4/136 (2010.01)
H01M 4/58 (2010.01)
H01M 4/62 (2006.01)
C01B 17/20 (2006.01)
C01G 19/00 (2006.01)
C01G 30/00 (2006.01)
C01G 1/12 (2006.01)
B82Y 30/00 (2011.01)
B82Y 40/00 (2011.01)

(52) U.S. Cl.
CPC ............. H01M 4/366 (2013.01); C01B 17/20 (2013.01); C01B 31/043 (2013.01); C01B 31/0446 (2013.01); C01B 31/0484 (2013.01); C01G 1/12 (2013.01); C01G 19/00 (2013.01); C01G 30/008 (2013.01); H01M 4/136 (2013.01); H01M 4/48 (2013.01); H01M 4/5815 (2013.01); H01M 4/625 (2013.01); H01M 10/054 (2013.01); H01M 10/0525 (2013.01); *B82Y 30/00* (2013.01); *B82Y 40/00* (2013.01); *C01P 2002/72* (2013.01); *C01P 2002/85* (2013.01); *C01P 2004/04* (2013.01); *C01P 2006/40* (2013.01); *H01M 2220/20* (2013.01); *H01M 2220/30* (2013.01)

(58) Field of Classification Search
CPC ...... H01M 4/625; C01B 17/02; C01B 31/043; C01B 31/0476; C01B 15/04; C01B 17/16; C01B 17/22; C01B 31/0423; C01B 31/0438; H01B 1/04; H01B 1/10
USPC ........ 252/500–519.1, 519.4; 423/445 R–448, 423/415.1, 563, 566.2; 977/842, 847, 977/895, 900
See application file for complete search history.

(56) References Cited

U.S. PATENT DOCUMENTS

2010/0291438 A1  11/2010  Ahn et al.
2011/0186786 A1   8/2011  Scheffer et al.
2014/0044922 A1*  2/2014  Lev .......................... B01J 23/14
                                                                 428/148

FOREIGN PATENT DOCUMENTS

WO   WO2012032518   *   3/2012   ............. B01J 21/08

OTHER PUBLICATIONS

Radich ("Cu2S Reduced Graphene Oxide Composite for High-Efficiency Quantum Dot Solar Cells. Overcoming the Redox Limitations of S2-/Sn2- at the Counter Electrode" Journ Phys Chem Let, 2, pp. 2453-2460, pub Sep. 13, 2011).*
Carnes ("Unique Chemical Reactivities of Nanocrystalline Metal Oxides toward Hydrogen Sulfide." Chem Mater, 14, pp. 1806-1811, web Mar. 9, 2002).*

(Continued)

*Primary Examiner* — Tri V Nguyen
(74) *Attorney, Agent, or Firm* — Seed IP Law Group LLP

(57) ABSTRACT

The invention relates to anode materials suitable for use in batteries, such as lithium ion batteries and sodium ion batteries. In particular, the anode material is a reduced graphene oxide/metal sulfide composite. Methods for forming the reduced graphene oxide/metal sulfide composite are also disclosed.

12 Claims, 13 Drawing Sheets

(56) References Cited

OTHER PUBLICATIONS

Nethravathi ("Graphene-nanocrystalline metal sulphide composites produced by a one-pot reaction starting from graphite oxide." Carbon, 47, pp. 20054-22059, online Apr. 1, 2009).*
Sathish ("Ultrathin SnS2 Nanoparticles on Graphene Nanosheets: Synthesis, Characterization, and Li-Ion Storage Applications." JPC C, 116, pp. 12475-12481, pub May 21, 2012).*
Jiang ("In situ synthesis of SnS2@graphene nanocomposites for rechargeable lithium batteries." JMC, 22, pp. 9494-9496, web Mar. 30, 2012).*
Bard et al. (eds.), *Standard Potentials in Aqueous Solutions*, Marcel Dekker, New York, 1985, pp. 95-100 and 172-175.

* cited by examiner (a) As-coated    (b) Discharged to 0V

METHOD FOR FORMING A REDUCED GRAPHENE OXIDE/METAL SULFIDE COMPOSITE AND ITS USE AS AN ANODE FOR BATTERIES

CROSS-RELATED TO RELATED APPLICATION

This application claims the benefits of priority of U.S. Provisional Patent Application No. 61/728,572, filed Nov. 20, 2012, and U.S. Provisional Patent Application No. 61/814,582, filed Apr. 22, 2013, and the contents of which being hereby incorporated by reference in their entirety for all purposes.

TECHNICAL FIELD

The invention relates to anode materials suitable for use in batteries, such as lithium ion batteries and sodium ion batteries. In particular, the anode material is a reduced graphene oxide/metal sulfide composite. Methods for forming the reduced graphene oxide/metal sulfide composite are also disclosed.

BACKGROUND

Commercial lithium ion batteries (LIB) nowadays can provide an energy density of more than 200 Wh/kg, but manufacturers are continuing to search for ways to raise the energy density further to meet the increasing power consumption needs of mobile electronics and electric vehicles. Developing new anode materials with capacity exceeding the theoretical capacity of graphite (i.e. 372 mAh g$^{-1}$) is a challenge. Numerous studies to replace graphite with other materials such as post-transition elements and their oxides were reported intensively. Metal sulfide is another category of materials that potentially give high capacity. However, these materials tend to show low capacity, low first cycle efficiency as well as poor stability.

While LIB have been the main energy storage medium for mobile applications for the past 20 years, sodium ion batteries (NIB) are now becoming to be seen as an alternative to LIB because of the lower costs and larger abundance of sodium, This has therefore recently attracted much attention. One of the main obstacles to the commercialization of NIB is the limited choice of anode materials that can provide good stability and high rate performance. Commercialization of LIB was mainly driven by the ability for lithium to intercalate into graphite, resulting in large and stable capacity. As opposed to lithium, sodium cannot be intercalated into graphite.

Therefore, there remains a need to provide for alternative anode materials for LIB and NIB to overcome, or at least alleviate the above problems.

SUMMARY

In a first aspect of the invention, a method for forming a reduced graphene oxide/metal sulfide composite is disclosed. The method may include:
- adding a dispersion comprising graphene oxide to hydrogen peroxide solution;
- adding one or more metal complex or salt solution to the dispersion;
- precipitating one or more peroxide-rich sol onto the graphene oxide surface to form one or more peroxide-rich metal oxide precursor-supported graphene oxide;
- treating the supported graphene oxide with a sulfur source;
- heating the treated supported graphene oxide at a first temperature to form a powder; and
- heating the powder at a second temperature to form the reduced graphene oxide/metal sulfide composite.

Another aspect of the invention relates to a reduced graphene oxide/metal sulfide composite formed by the method of the first aspect.

The third aspect of the invention describes use of the present reduced graphene oxide/metal sulfide composite as an anode for a lithium ion or sodium ion battery.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

Figure 1:
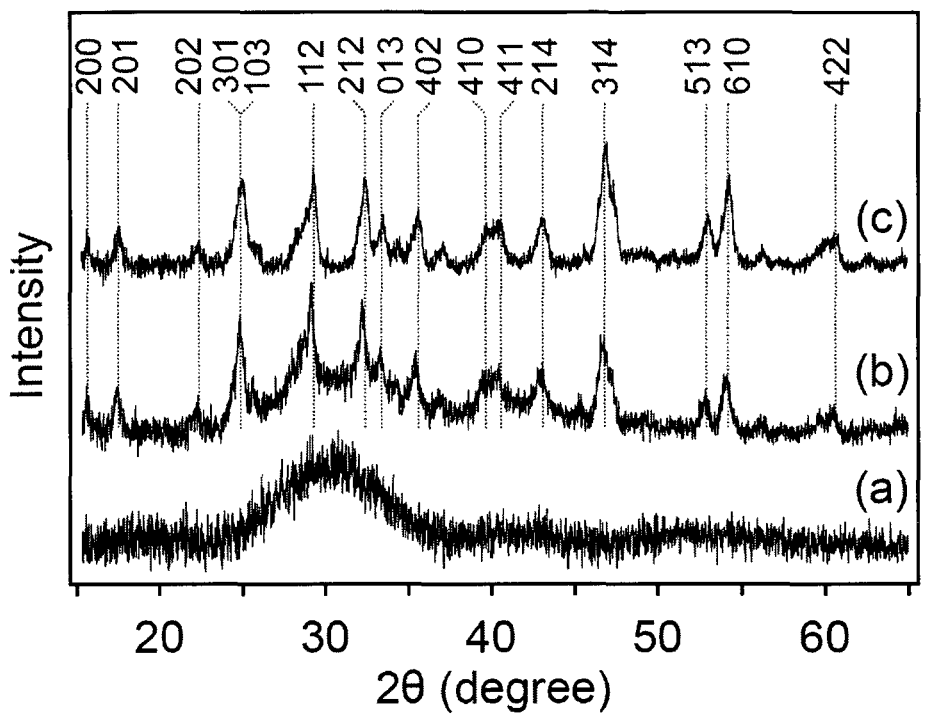
FIG. 1 shows X-ray diffractograms of (a) GO-Sb(V)-S, (b) rGO-Sb$_2$S$_3$-0.5 h, and (c) rGO-Sb$_2$S$_3$-5 h. Database peaks of stibnite are added for comparison.

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Existing methods for forming reduced graphene oxide-metal sulfide composites are mostly thermal or physical in nature, yielding composite materials in the first synthetic step. This causes loss of ability to tailor the individually coated graphene oxide (GO) building blocks. Moreover, the resultant reduced graphene oxide-metal sulfide composites consist of agglomerates of metal sulfide particles on the surface of the graphene sheets, which leads to non-uniform reaction with Li or sodium in battery applications.

Present disclosure describes a technique with a bottom up approach, whereby the graphene dispersion is first coated by amorphorous or crystalline thin film using a hydrogen peroxide synthesis routine, and then followed by sulfurization and heat treatment to convert to the desirable composition. This allows an intimate growth of a uniform layer of material on the graphene sheet, improving the connectivity between the active material and the graphene template and also the uniformity of reaction with Li or Na.

The sulfurization step is a unique solution-based conversion process, and the heat treatment process is to increase crystallinity of the metal sulfide layer and also to reduce the graphene oxide sheets.

Accordingly, a method for forming a reduced graphene oxide/metal sulfide composite is disclosed herein.

In present context, the term "composite" refers generally to a mixture of materials physically mixed or blended, whereby each material in the mixture generally retains the respective property. The phrase "reduced graphene oxide/metal sulfide composite" therefore refers to a material formed of a mixture of reduced graphene oxide (rGO) and metal sulfide (may be represented by its chemical formula). Unless stated otherwise, for brevity the phrase "reduced graphene oxide/metal sulfide composite" may simply be termed "composite", "rGO/Sb$_2$S$_3$,", "rGO/SnS", and the like where Sb$_2$S$_3$ and SnS are the respective metal sulfide in each composite. In certain embodiments, the metal sulfide may be doped. In other embodiments, the metal sulfide may be undoped. The doping metal may, for example, be sodium or lithium.

Graphene is a substance made of pure carbon, with atoms arranged in a regular hexagonal pattern similar to graphite, but in a one-atom thick sheet. It is an allotrope of carbon whose structure is a single planar sheet of sp$^2$-bonded carbon atoms that are densely packed in a honeycomb crystal lattice. In order to obtain graphene, graphite can be chemically modified by oxidation reaction to form graphite oxide which is then reduced to obtain graphene. In graphene oxide, the carbon atoms are bonded to oxygen functional groups through covalent bonds.

Graphite oxide is formed by many layers of graphene oxide. Graphene oxide may be prepared by the chemical exfoliation of graphite oxide which is oxidized in potassium permanganate dissolved in the concentrated sulfuric acid, known as the Hummers method.

The present method for forming the composite may include adding a dispersion comprising graphene oxide to hydrogen peroxide solution. The graphene oxide may be prepared from exfoliated graphite by Hummers method or a modification thereof. The graphene oxide may be dispersion in water to form the dispersion.

Next, one or more metal complex or salt solution may be added to the dispersion and one or more peroxide-rich sol may be precipitated onto the graphene oxide surface to form one or more peroxide-rich metal oxide precursor-supported graphene oxide.

In present context, the one or more metal complex or salt solution refers to a solution containing one metal complex or salt precursor, or two metal complex or salt precursors, or three metal complex or salt precursors, or even more. In particular, the metal complex or salt precursor in the one or more metal complex or salt solution may be a metal hydroxo complex. For example, the one or more metal complex or salt solution may include, but is not limited to, hydroxoantimonate solution, hydroxostannate solution, hydroxogermanate solution, hydroxozincate solution, or a mixture thereof. Accordingly, the one or more peroxide-rich sol precipitated onto the graphene oxide surface may include, but is not limited to, peroxoantimonate, peroxostannate, peroxogermanate, peroxozincate, or a mixture thereof. In one embodiment, the one or more metal complex or salt solution may be hydroxoantimonate solution and thus antimony sulfide is obtained subsequently. In another embodiment, the one or more metal complex or salt solution may be hydroxostannate solution and thus tin sulfide is obtained subsequently. In yet further embodiments, the one or more metal complex or salt solution may be a mixture of hydroxoantimonate solution and hydroxostannate solution, and thus a mixture of antimony and tin sulfides are obtained subsequently.

The following description relates to a method for forming a reduced graphene oxide/antimony sulfide composite. However, it is to be understood and appreciated that the description serves as illustration purposes and does not limit the scope of the invention as set out in the claims.

In one embodiment, the hydroxoantimonate solution may be prepared by first dissolving SbCl$_5$ in water, followed by neutralization by a base. Optionally, if a doped antimony sulfide in the composite is desired, a doping metal precursor may be added to the dispersion prior to the precipitation step. The metal of the doping metal precursor may be lithium or sodium. The precipitate formed thereof may then be dissolved in aqueous tetramethylammonium hydroxide under heating and concentration of the antimony present in the solution adjusted by addition of deionized water.

In one embodiment, precipitation of peroxoantimonate onto the graphene oxide surface may be carried out by the addition of an antisolvent, such as ethanol-diethyl ether mixture.

The method may next include treating the peroxoantimonate-supported graphene oxide with a sulfur source. This step serves to sulfurize the peroxoantimonate-supported graphene oxide.

In various embodiments, the peroxoantimonate-supported graphene oxide may be sulfurized by bubbling hydrogen sulfide through a suspension of the peroxoantimonate-supported graphene oxide. The suspension may include an alcohol suspension, such as ethanol suspension.

After the sulfurization step, the sulfur treated peroxoantimonate-supported graphene oxide may be heated at a first temperature to form a powder. The powder is a GO-Sb(V)-S powder.

In various embodiments, the first temperature may be about 60° C. to about 100° C., such as 60° C., or 65° C., or 70° C., or 75° C., or 80° C., or 85° C., or 90° C., or 95° C., or 100° C. In one embodiment, the first temperature may be about 80° C. The heating may be carried out for a period of time under vacuum, such as 0.5 h, or 1 h, or 1.5 h, or 2 h, or 2.5 h, or 3 h, or 3.5 h, or 4 h, or 4.5 h, or 5 h, or 5.5 h, and above up to about 10 h.

The method may further include heating the powder at a second temperature to form the reduced graphene oxide/metal sulfide composite. This second heat treatment step helps to increase crystallinity of the metal sulfide layer and to reduce the graphene oxide sheets.

In various embodiments, the second temperature may be about 200° C. to about 500° C., such as 200° C., or 250° C., or 300° C., or 350° C., or 400° C., or 450° C., or 500° C. In one embodiment, the second temperature may be about 300° C. The heating may be carried out for a period of time under vacuum, such as 0.5 h, or 1 h, or 1.5 h, or 2 h, or 2.5 h, or 3 h, or 3.5 h, or 4 h, or 4.5 h, or 5 h, or 5.5 h, and above up to about 10 h.

In one embodiment, the powder may be heated at about 300° C. for 5 h.

In another embodiment, the powder may be heated at about 300° C. for 0.5 h.

In various embodiments, the metal sulfide may be $MS_x$, wherein M is a metal selected from the group consisting of Ge, Sn, Zn, Sb, Zn, and In, and $1 \leq x \leq 3$. For example, the metal sulfide may be, but is not limited to, antimony (III) sulfide ($Sb_2S_3$), antimony (V) sulfide ($Sb_2S_5$), tin (II) sulfide (SnS), tin (IV) sulfide ($SnS_2$), zinc sulfide (ZnS), germanium (II) sulfide (GeS), germanium (IV) sulfide ($GeS_2$), indium (III) sulfide ($In_2S_3$), or a mixture thereof.

In preferred embodiments, the metal sulfide may be $Sb_2S_3$ or $SnS_2$.

The rGO/metal sulfide composite, such as rGO/$Sb_2S_3$ or rGO/$SnS_2$ composite, formed by the present method finds its use as suitable anode materials in lithium ion batteries or sodium ion batteries. In one example (see Example 2 below), the rGO/$Sb_2S_3$ composite shows high capacity of 730 mAh g$^{-1}$ at a rate of 50 mA g$^{-1}$, with excellent rate capability up to 6 C and good cycle performance as anode materials for sodium ion batteries.

In order that the invention may be readily understood and put into practical effect, particular embodiments will now be described by way of the following non-limiting examples.

EXAMPLES

Example 1

Conversion of Hydroperoxoantimonate Coated Graphenes to Sb2S3@Graphene for a Superior Lithium Battery Anode In this example, a method for conformal coating of reduced graphene oxide (rGO) by stibnite nanocrystallites is illustrated. First, graphene oxide (GO) supported amorphous hydroperoxoantimonate was produced using hydrogen peroxide synthesis route. Sulfurization of the amorphous antimonate yielded supported antimony (V) oxide nanoparticles and sulfur, which were then converted by high temperature vacuum treatment to 15-20 nm rGO supported stibnite. The usefulness of the new material and synthesis approach are demonstrated by highly efficient and stable lithium battery anodes. Since both sulfur lithiation and antimony-lithium alloying are reversible, they both contribute to the charge capacity, which exceeded 720 mA h g$^{-1}$ after 50 cycles at a current density of 250 mA g$^{-1}$. The very small crystallite size of the stibnite provides a minimum diffusion pathway and allows for excellent capacity retention at a high rate (>480 mA h g$^{-1}$ at 2000 mA g$^{-1}$ was observed). The nanoscale dimensions of the crystallites minimize lithiation-induced deformations and the associated capacity fading upon repeated charge-discharge cycles. The flexibility and conductivity of the rGO assure minimal ohmic drop and prevent crack formation upon repeated cycles.

Experimental Section $Sb_2S_3$ coated GO was synthesized by a three-step process. First, peroxoantimonate supported GO was prepared. Then, this material was further treated by $H_2S$ and heated to 80° C. to give GO-Sb(V)-S. Finally, the product was heat treated in vacuum to give the rGO supported antimony sulfide composites, rGO-$Sb_2S_3$-5 h and rGO-$Sb_2S_3$-0.5 h.

Preparation of GO. GO was synthesized from exfoliated graphite by a modified Hummers method. First, exfoliated graphite powder (1 g) was added to a solution of $K_2S_2O_8$ (1.67 g) and $P_2O_5$ (1.67 g) in 8 mL concentrated $H_2SO_4$. The mixture was kept at 80° C. for 4.5 h on a hot plate. After the mixture was cooled to room temperature, it was diluted with 0.35 L of deionized water (DIW) and filtered.

Then the preoxidized material was washed with DIW and dried at 60-70° C. overnight. Next, preoxidized carbon was redispersed in 40 mL of concentrated $H_2SO_4$ with the mixture kept in an ice bath. Subsequently, 5 g of potassium permanganate were added gradually under constant stirring to avoid overheating. The mixture was stirred at 35° C. for 2 h and then slowly diluted with 80 mL of DIW upon cooling in the ice bath. The mixture was stirred for an additional 2 h and then 250 mL more DIW were added, followed by the addition of 6 mL of 30% $H_2O_2$ to react with the excess of permanganate. The color of the solution changed to yellow after addition of the peroxide. The oxidized product was filtered and washed with 100 mL HCl (1:10) to remove metal ion impurities, followed by washing with 300 mL of DIW and by dialysis to remove the acid. A dispersion of GO in water was prepared by dispersing the oxidized material in DIW in an ultrasound bath for 2 h. Aqueous GO dispersions were stable for at least a few months.

Preparation of hydroxoantimonate precursor solutions. 10 mL of $SbCl_5$ (0.078 mol) was dissolved in several mL of DIW and neutralized with ammonia until pH 7. The precipitate was washed several times with DIW and dissolved in 28.5 mL of 25% aqueous tetramethylammonium hydroxide (0.078 mol) under moderate heating (the dissolution process takes approximately 4 h). After full dissolution, DIW was added to achieve 1.4 M antimony concentration.

Peroxoantimonate supported GO. Typically, 5.0 g of aqueous GO dispersion (2% wt.) were dispersed in 30 mL of hydrogen peroxide (20%) by sonication. Then, 3.2 mL of hydroxoantimonate solution (1.4 M) were added. Precipitation of peroxoantimonate onto the GO surface was accomplished by addition of 300 mL ethanol-diethyl ether mixture (1:1). The coated GO was washed with the ethanol-ether solution and dried under vacuum at room temperature. The coated material was stored in a 4° C. refrigerator.

Sulfurization of peroxoantimonate supported GO. Sulfurization was carried out by bubbling hydrogen sulfide for 2 h through a 100 mL stirred alcohol suspension of 500 mg peroxoantimonate supported GO. The peroxoantimonate-GO was taken wet after centrifugation and contained some ethanol with residual hydrogen peroxide. Hydrogen sulfide gas was produced in a Kipp's apparatus from concentrated HCl and iron sulfide. At the end of the reaction the excess $H_2S$ gas was collected by an alkali trap.

Preparation of GO-Sb(V)-S. After the sulfurization step the material was washed with alcohol, centrifuged, and dried in vacuum. Subsequently, the GO-Sb(V)-S powder was heated at 80° C. for 5 h in vacuum.

Preparation of GO-Sb2S3-5 h and GO-Sb2S3-0.5 h. Heat treatment at 300° C. of the GO-Sb(V)-S powder was carried out in a tube furnace at 10-5 Pa pressure. The sample rGO-$Sb_2S_3$-5 h was heated for 5 h and rGO-$Sb_2S_3$-0.5 h was heated for 30 min. Heating to the set point was conducted at a rate of 0.8° C. $\min^{-1}$ to prevent loss of the products by carryover.

Material Characterization

High Resolution Transmission Electron Microscope (HRTEM) studies were conducted using a JEM-2100F (Japan). HRTEM imaging was performed at 200 kV. A drop of the suspension of the sample in ethanol was deposited onto 400 mesh copper grids covered with a lacey carbon net.

High Resolution Scanning Electron Microscope (HRSEM) imaging was performed using the FEI Sirion HR SEM (Eindhoven, Holland). Accelerating voltage was set at 5-15 kV with a 5 mm working distance and imaging was conducted using a high resolution mode with a Through-the-Lens Detector. The specimen was prepared by dispersion of dried samples in ethanol in an ultrasonic bath and the suspension was then dropped on a silicon wafer to dry.

Scanning Transmission Electron Microscope (STEM) imaging was performed using the FEI Magellan™ 400L (Eindhoven, Holland). The specimen was prepared by deposition of a drop of the ethanol suspension of the sample onto 400 mesh copper grids covered with a lacey carbon net.

X-ray photoelectron spectroscopy (XPS) measurements were performed on a Kratos Axis Ultra X-ray photoelectron spectrometer (Manchester, UK). High resolution spectra were acquired with a monochromated Al Kα (1486.6 eV) X-ray source with 0° takeoff angle. The pressure in the test chamber was maintained at 1.7·10-9 Torr during the acquisition process. Data analysis was performed with Vision processing data reduction software (Kratos Analytical Ltd.) and CasaXPS (Casa Software Ltd.).

X-ray powder diffraction (XRD) measurements were performed on a D8 Advance Diffractometer (Bruker AXS, Karlsruhe, Germany) with a goniometer radius of 217.5 mm, Göbel Mirror parallelbeam optics, 2° Sollers slits and a 0.2 mm receiving slit. The powder samples were carefully filled into low background quartz sample holders. The specimen weight was approximately 0.5 g. XRD patterns from 15° to 65° 2θ were recorded at room temperature using CuKα radiation (k=1.5418 Å) under the following measurement conditions: tube voltage of 40 kV, tube current of 40 mA, step scan mode with a step size 0.02° 2θ and counting time of 1 s/step. XRD patterns were processed using Diffrac Plus software.

Raman spectroscopy was conducted using the laser wavelength of 488 nm on a CRM200 confocal Raman spectrometer, WITec.

Elemental analysis. Sulfur, Sb and carbon contents were determined by EDX. Only the ratio between the different atom contents was depicted in Table 1 due to the inaccuracy in the determination of the oxygen content. Carbon was determined by EuroVector Euro EA Elemental Analyzer.

Active oxygen determination. Peroxoantimonate coated GO was dried at room temperature under vacuum or taken wet after centrifugation for hydrogen peroxide quantification. 50 mg of the dried material was redispersed in an acid mixture, which was prepared by dilution of 1 mL of concentrated $H_2SO_4$ with 4 mL of DIW and then mixed with 5 mL of saturated boric acid solution. The dispersion was stirred for 20 h and then filtered to remove the graphenes. The hydrogen peroxide that was released by the acid was determined by permanganatometric titration with 0.03 N $KMnO_4$ according to a reported protocol.

Electrochemical Characterization

Four types of Sb containing samples were taken for electrochemical evaluation: Bulk crystalline $Sb_2S_3$ (Sigma-Aldrich) was used as-is and the materials denoted as GO-Sb(V)-S, rGO-$Sb_2S_3$-0.5 h and rGO-$Sb_2S_3$-5 h. In the following we use the same nomenclature for the active electrode material and the anode that was made from it.

Electrochemical evaluation. Each of the different lithiating materials was mixed with acetylene black and carboxymethyl cellulose sodium salt (CMC, Sigma-Aldrich) in a weight ratio of 6:2:2 with DIW as the medium to form slurry. The slurry was then coated on roughened copper foil as a current collector using a doctor blade. The electrode was then dried at 80° C. and pressed with a roll press. The electrodes were cut into 16 mm diameter discs and assembled with Li metal as counter electrodes in a 2016 coin cell. 1 M lithium hexafluorophosphide ($LiPF_6$) in ethylene carbonate (EC) to diethyl carbonate (DEC) of 1:1 was the electrolyte. The cells were then tested with a battery tester between 0 to 2.5 V vs. Li/Li$^+$. The typical charge-discharge rate is 100 mA g$^{-1}$ during the first five cycles and 250 mA g$^{-1}$ for subsequent cycles. The current rate used is typically 2.5 times higher than that reported in the literature. Cyclic voltammetry (CV) profiles were taken at a scan rate of 0.1 mV s$^{-1}$ between 0.005 V and 3 V vs. Li/Li$^+$. Rate performance was performed by testing the cell at current rates of 100, 250, 500, 1000, 1500 and 2000 mA Results and Discussion The first part of this section describes the characterization of the different intermediate materials en route to the production of the rGO supported $Sb_2S_3$ anodes. The second part describes comparative electrochemical characterization of four different antimony samples, which were tested for their electrochemical lithiation capability. $Sb_2S_3$ coated rGO was synthesized by a three-step process. First, peroxoantimonate supported GO was prepared from hydroxoantimonate and GO precursors whose preparation protocols are detailed in the experimental section. The materials was further treated by $H_2S$ and heated to 80° C. to give a material denoted here as —Sb(V)-S. This product was converted by 0.5 and 5 h heat treatments in vacuum to rGO supported stibnite denoted here as rGO-$Sb_2S_3$-0.5h and rGO-$Sb_2S_3$-5h, respectively.

XRD studies. The X-ray powder diffraction of the different samples is presented in FIG. 1. The XRD of the GO-Sb(V)-S sample reveals only a wide hump around 2θ=31°, corresponding to an amorphous coating. This hump is only partly removed after heat treatment for 0.5 h at 300° C., (in the sample rGO-Sb$_2$S$_3$-0.5 h) though the characteristic pattern of stibnite is already visible at this heating stage (FIG. 1, curve b). After 5 h at 300° C. the amorphous hump disappeared and only the characteristic pattern of stibnite was retained in the rGO-Sb$_2$S$_3$-5 h sample. Application of the Scherrer equation gives 19 nm and 16 nm for the average crystallite size of the stibnite in rGO-Sb$_2$S$_3$-0.5 h and rGO-Sb$_2$S$_3$-5 h, respectively. This difference is well within the error margins of the Scherrer estimate.

Figure 2:
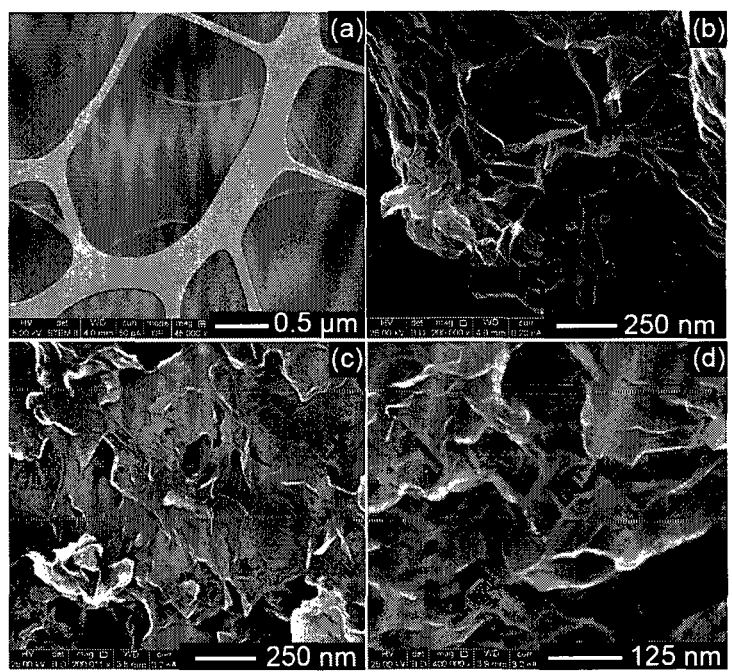
FIG. 2 shows (a) STEM micrograph of bare GO and SEM micrographs of (b) GO-Sb(V)-S, (c) rGO-Sb$_2$S$_3$-0.5 h, and (d) rGO-Sb$_2$S$_3$-5 h.
Figure 3:
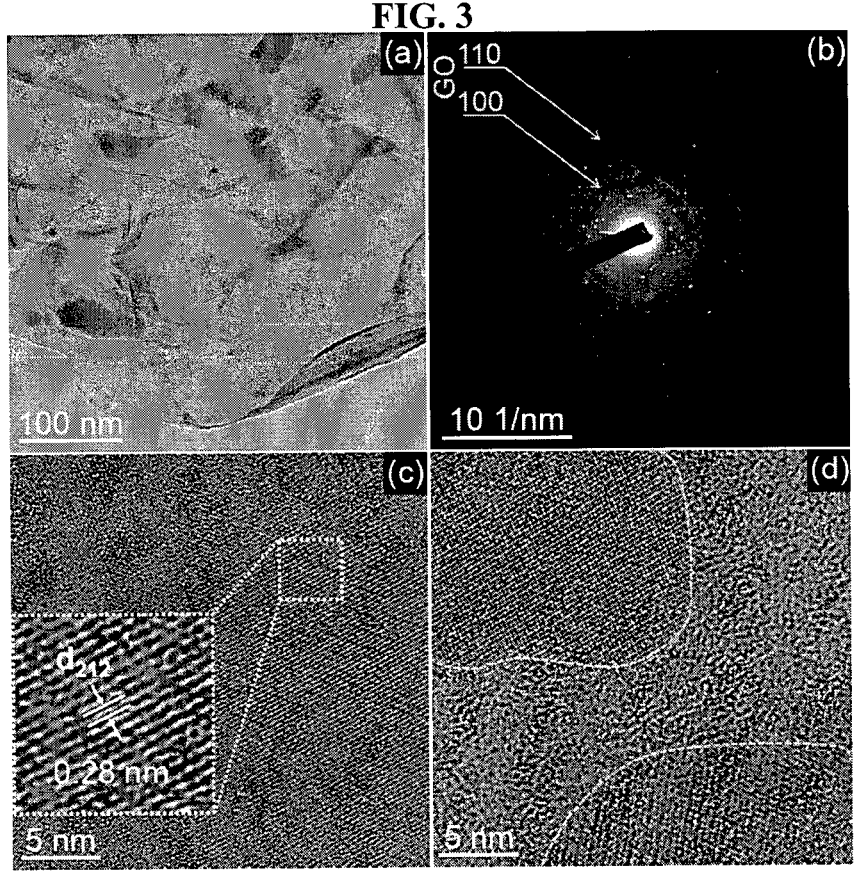
FIG. 3 shows high resolution TEM micrographs of rGO-Sb$_2$S$_3$-5 h at different magnifications (a, c, d) and the respective SAED image (b) showing a diffraction pattern corresponding to stibnite.

Comparative electron microscopy of the electrode materials. Scanning electron imaging of bare GO and the different active electrode materials (GO-Sb(V)-S, rGO-Sb$_2$S$_3$-0.5 h, rGO-Sb$_2$S$_3$-5 h) are depicted in FIG. 2. The starting GO comprises of ca. 1 μm flat sheets whereas the coated GO all have a corrugated structure. Typical transmission electron microscope (TEM) micrographs of the GO-Sb$_2$S$_3$-5 h are depicted in FIG. 3. The ultrathin coating of the antimony species is clearly visible in all coated samples. Additionally, the TEM images reveal the ordered diffraction planes of the crystallites with inter-planar distance of 0.28 nm, which agrees well with the (212) inter-planar distance of stibnite. On average, the Sb$_2$S$_3$ crystallite size determined by TEM studies is between 15-30 nm. Selected area electron diffraction (SAED) of the GO supported antimony sulfide (FIG. 3b) reveals two types of diffraction patterns: i) dotted rings of crystalline GO (with d-spacings of 0.21 and 0.12 nm), and ii) dotted diffraction corresponding well to stibnite spacings (with selected d-spacings of 0.19, 0.28, 0.31, 0.36 nm).

Chemical analysis. The concentration of active oxygen in the thoroughly washed and dried GO supported peroxoantimonate was 5.35% wt. which corresponds to 10.7% wt. of peroxogroups coordinated to the antimony (V). EDX and elemental analysis results of the three GO samples are summarized in Table 1. Clearly, the GO-Sb(V)-S contains a large excess of sulfur that is sufficient for stibnite formation (S/Sb=2.59 versus 1.5 stiochiometric S to Sb in Sb$_2$S$_3$). We did not make an effort to optimize the graphene content, which is rather high (carbon content=14.8-17.6% wt.), which provides leeway for further capacity improvement in future studies.

Raman studies. The D to G Raman band ratios of the different samples is presented in Table 1 and reveals a clear decrease of the D band, corresponding to increased sp$^2$ hybridization and in turn corresponding to better reduction of the GO by the 300° C. heat treatment. XPS studies The S 2p spectra of the three samples are presented in FIG. 4 (curves a-c). The GO-Sb(V)-S photoelectron spectrum contains only the elemental sulfur peaks at 164.1 and 165.3 eV. Only after 300° C. heat treatment do the sulfide (i.e. the divalent form) photoelectron peaks appear. The ratio of divalent to zero-valent sulfur slightly increases with longer heat treatment from 2.1 at rGOSb$_2$S$_3$-0.5 h to 3.0 at rGO-Sb$_2$S$_3$-5 h, which shows that sulfurization gradually commence at 300° C.

Figure 4:
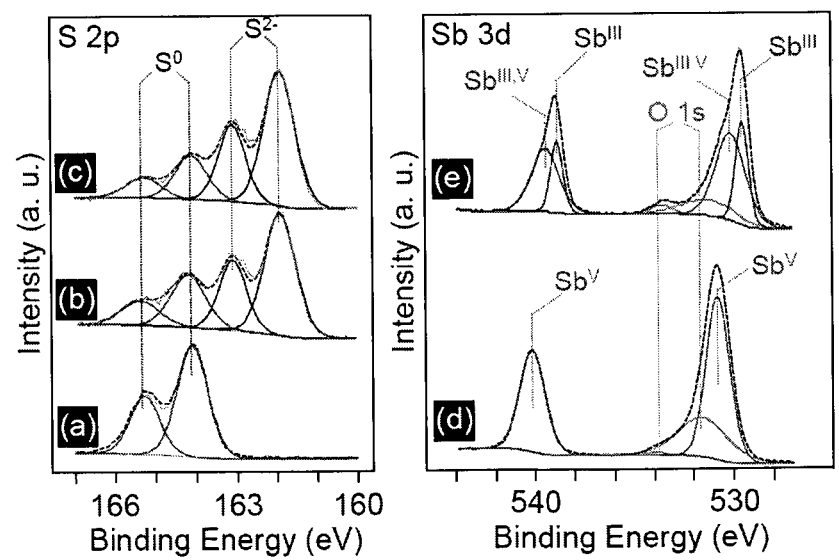
FIG. 4 shows S 2p (frames a-c) and Sb 3d (frames d-e) XPS spectra of three electrode materials: (a) S 2p spectrum of GO-Sb(V)-S; (b) S 2p spectrum of rGO-Sb$_2$S$_3$-0.5 h; (c) S 2p spectrum of rGO-Sb$_2$S$_3$-5 h; (d) Sb 3d spectrum of GO-Sb(V)-S; (e) Sb 3d spectrum of GO-Sb$_2$S$_3$-0.5 h.

The Sb 3d spectra of the samples are presented in FIG. 4 (curves d and e). Surprisingly, even after sulfurization at 80° C. the Sb 3d 3/2 and 5/2 peaks of GO-Sb(V)-S show only the pentavalent antimony state (curve d). The Sb 3d 3/2 of the two 300° C. heated samples were practically identical and show both. Sb (III) and Sb (IV) photoelectron peaks (FIG. 4e). Although tetravalent antimony does not exist, it is known that a 1:1 mix of Sb (V) and Sb (III) states in crystalline Sb$_2$O$_4$ provides an apparent binding energy, which is assigned as Sb (IV). Taking into account that the Sb (IV) signal represents an equal amount of Sb (III) and Sb (V), it is possible to estimate the ratio of the trivalent to the pentavalent antimony in the different samples. These values (2.0 for rGO-Sb$_2$S$_3$-0.5 h and 2.5 for rGO-Sb$_2$S$_3$-5 h) are summarized in Table 1. This type of quantification should be regarded for what it is, a merely rough estimate based on peak deconvolution.

Surprisingly, although the EDX studies (third column in Table 1) show that there is enough sulfur in the GO-Sb(V)-S sample for complete sulfurization of the antimony, the Sb still retained the pentavalent state and in fact no sulfide was observed in the XPS—all the sulfur was in the zero-valent state. Thus it can be concluded that oxidation of the sulfide to zero-valent sulfur took place by the peroxide, and Sb sulfurization did not take place at all even after 80° C. heat treatment. It can be further concluded that the dominant Sb form in GO-Sb(V)-S is an amorphous Sb (V) oxide and not Sb (V) sulfide. In fact, even the Sb 3d photoelectron spectrum is sufficient to show that sulfurization did not take place at 80° C. in view of the fact that studies have clearly shown that Sb$_2$S$_5$ does not exist.

Thermodynamically, sulfurization should have reduced the antimony (V) to antimony (III) in addition to sulfur precipitate produce. Since only thermodynamic data of aqueous solutions was found, we base the following discussion on the aqueous set of data. We assume that the thermodynamics in alcohol should be very similar.

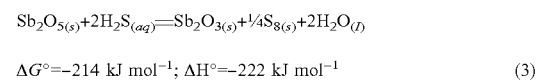

$$\Delta G°=-214 \text{ kJ mol}^{-1}; \Delta H°=-222 \text{ kJ mol}^{-1} \quad (3)$$

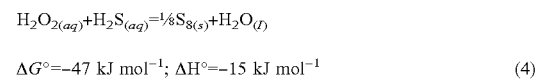

$$\Delta G°=-47 \text{ kJ mol}^{-1}; \Delta H°=-15 \text{ kJ mol}^{-1} \quad (4)$$

In fact, thermodynamically, the sulfurization of the trivalent antimony should have proceeded to give antimony (III) sulfide even at low temperature.

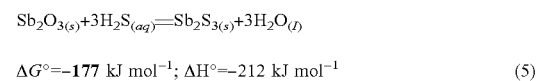

$$\Delta G°=-177 \text{ kJ mol}^{-1}; \Delta H°=-212 \text{ kJ mol}^{-1} \quad (5)$$

Despite the downhill thermodynamics, we received only antimony (V) oxide, probably due to the formation of a passivation layer of sulfur over the antimony oxide nanoparticles. Additionally, excess sulfur was formed also by the free hydrogen peroxide.

At high temperature, however, the sulfur further reacts with the antimony oxide. The reaction

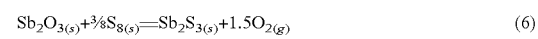

is unlikely even at high temperature. However, we recently demonstrated that graphene can reduce antimony oxide to elemental antimony even at 300° C., similar to the reaction of antimony oxide with carbon:

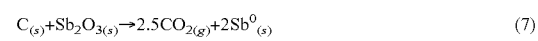

This reaction can take place already at 389° C. Elemental antimony formed by reaction (7) can then react with the supported zero-valent sulfur to give the supported antimony sulfide in rGOSb$_2$S$_3$-0.5 h and rGO-Sb$_2$S$_3$-5 h as observed in FIGS. 1, 3 and 4.

Figure 5:
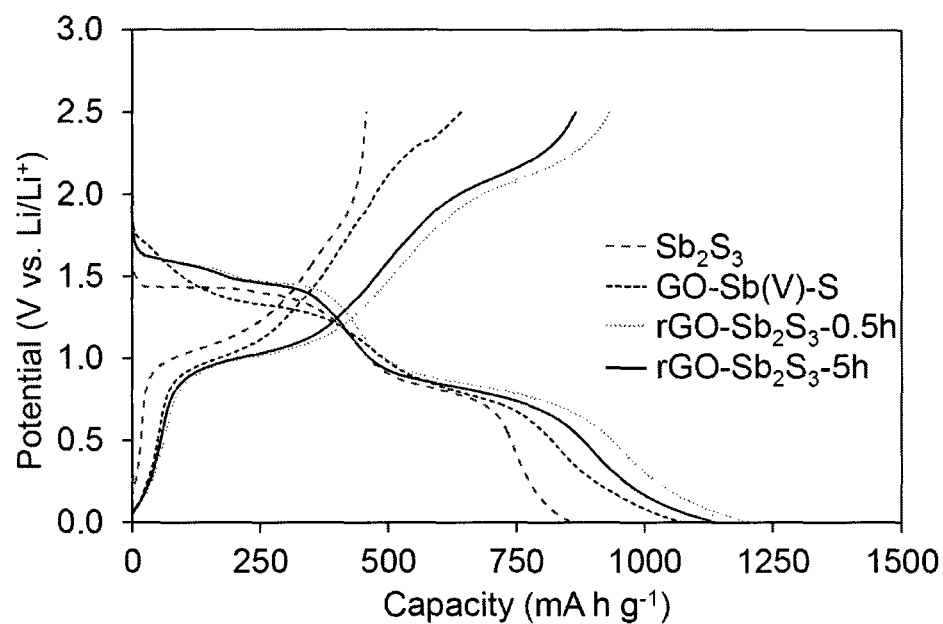
FIG. 5 shows first cycle discharge-charge profiles of the different materials at a current rate of 100 mA g$^{-1}$.

Electrochemical characterization. The sulfur and antimony containing materials (GO-Sb(V)-S, rGO-Sb$_2$S$_3$-0.5 h, rGO-Sb$_2$S$_3$-5 h and commercial stibnite) were made into coin cells for electrochemical evaluation. First cycle discharge-charge profiles of different samples are shown in FIG. 5. The capacities during discharge and charge are listed in Table 2 and Table 3. First discharge capacities of the bulk $Sb_2S_3$ sample is around 900 mA h g$^{-1}$, corresponding to roughly 6 electrons transfer during first discharge, suggesting full conversion and alloying of $Sb_2S_3$ into $Li_2S$ and $Li_3Sb$. The samples with GO and rGO show a slightly higher first cycle discharge capacity (in the range 1076 and 1210 mA h g$^{-1}$ as depicted in column 2 of Table 2) probably because of the presence of some antimony (V) oxide in the samples. However, not all of the Li inserted into the material can be extracted back out. The irreversible capacity is highest for the bulk $Sb_2S_3$, where the first cycle efficiency is only 53.3%. This big loss in capacity during the first cycle is a major problem with the bulk material. First cycle efficiency of the amorphous GO-Sb(V)-S is also rather low, 59.6%, due to the irreversibility of lithium oxide formation induced by the low conductivity of the GO scaffold.

In contrast, the first cycle efficiency is 76.9% for the 0.5 h treated sample (rGO-$Sb_2S_3$-0.5 h). Higher capacity is obtained for the samples, which is attributed to the formation of stibnite. Thirty min is enough for antimony sulfide formation. Further annealing for 5 h does not improve the cycle efficiency but leads to slightly lower capacity (which is however within our experimental error).

$Sb_2S_3$ exhibits two plateaus during initial discharge, 1.42 V and 0.80 V, which are characteristic of the conversion reaction to $Li_2S$ and the alloying reaction to $Li_3Sb$, respectively. Similar plateaus are observed for the annealed samples (rGO-$Sb_2S_3$-0.5 h and rGO$Sb_2S_3$-5 h). In contrast, the amorphous GO-Sb(V)-S shows a first plateau at around 1.3 V, lower than that of the other samples. This is attributed to the presence of antimony (V) oxide in the material rather than antimony sulfide.

Comparing the charge profiles of the four samples, the main difference can be seen above 2 V vs. Li/Li$^+$. Bulk $Sb_2S_3$ shows a sharp increase in potential around this range, whereas the samples with GO (GO-Sb(V)-S) show a plateau at around 2.35 V and the ones with rGO (rGO-$Sb_2S_3$-0.5 h and rGO-$Sb_2S_3$-5 h), have a plateau around 2 V.

Figure 6:
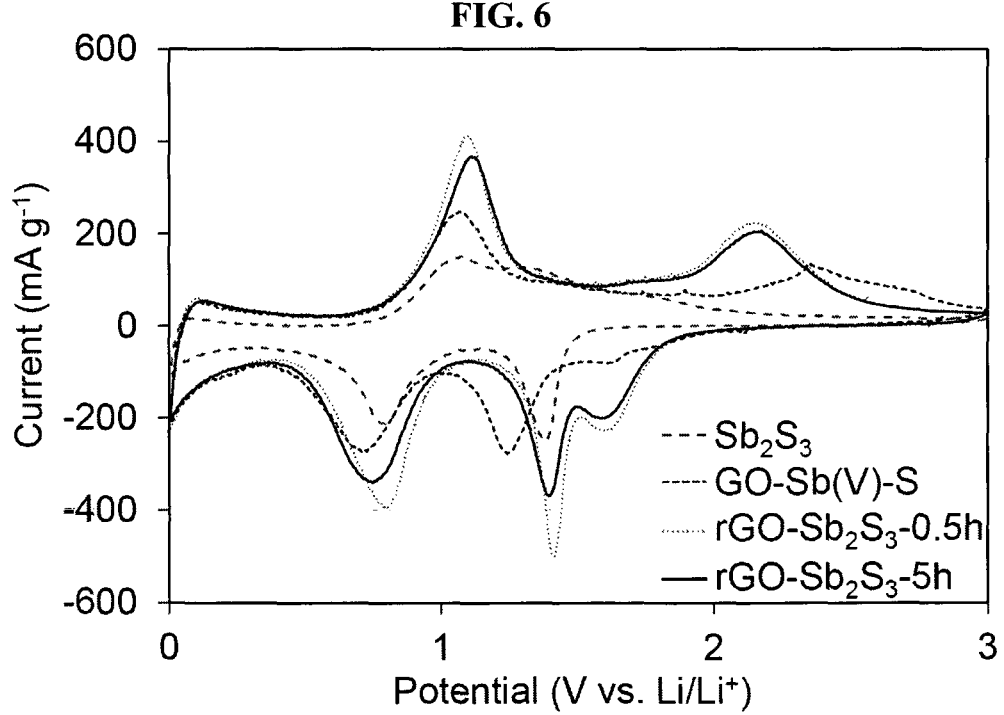
FIG. 6 shows CV profiles of different anode materials during the second cycle (0.1 mV s$^{-1}$).

The reaction potentials of the different materials can be seen more clearly by cyclic voltammetry analysis. FIG. 6 shows the CV profiles of the four different samples during the second cycle. The redox pairs at 0.8 V during reduction and 1.1 V during oxidation come from alloying and dealloying of Sb with Li. Peaks above 1.3 V originate from sulfur in the material. The bulk commercial material shows a long broad tail with no significant peak during charging. In contrast, the amorphous GO-Sb(V)-S and the crystalline $Sb_2S_3$/rGO samples (rGO-$Sb_2S_3$-0.5 h and rGO-$Sb_2S_3$-5 h) show an additional peak around 2.1-2.35 V during oxidation, suggesting that the addition of GO in the system enhances reaction of the materials at higher potential. The peak positions of 1.42 and 1.62 V during reduction and 2.13 V during oxidation for the rGO-$Sb_2S_3$-0.5 h and rGO-$Sb_2S_3$-5 h samples are consistent with those in the literature. Lower polarization is observed because the graphene is reduced during the annealing process (as clearly observed in the D to G peak intensity ratio of the Raman spectra, Table 1) and therefore the conductivity of the material increases afterwards. The magnitude of the measured current is also the largest, which corresponds to higher capacity from these annealed materials.

In comparison, the amorphous GO-Sb(V)-S that was dried at 80° C. shows a shift in the oxidation peak to 2.35 V and the reduction peak to 1.25 V, suggesting higher polarization in the material. This is possible because GO has rather low conductivity.

Figure 7:
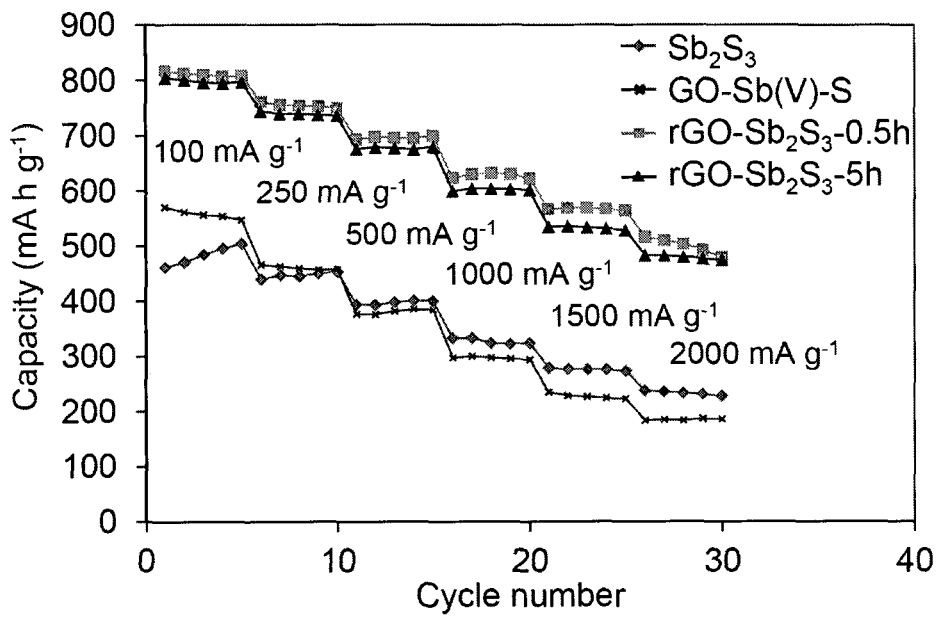
FIG. 7 shows rate performance of different anode materials.

The samples were subjected to charge and discharge at different current rates and the results are shown in FIG. 7. As previously stated, samples with rGO show a much higher capacity to that of the bulk $Sb_2S_3$ and the one with GO. Samples with rGO also show excellent capacity retention at high rate with a capacity of about 480 mAh g$^{-1}$ even at a rate of 2000 mA g$^{-1}$ (about 60% compared to the capacity at 100 mA g$^{-1}$). In contrast, the sample with GO only gives a capacity of 180 mA h g$^{-1}$ at 2000 mA g$^{-1}$ (32% compared to the capacity at 100 mA g$^{-1}$). The better rate performance is attributed to the enhanced conductivity of the rGO sheet.

Figure 8:
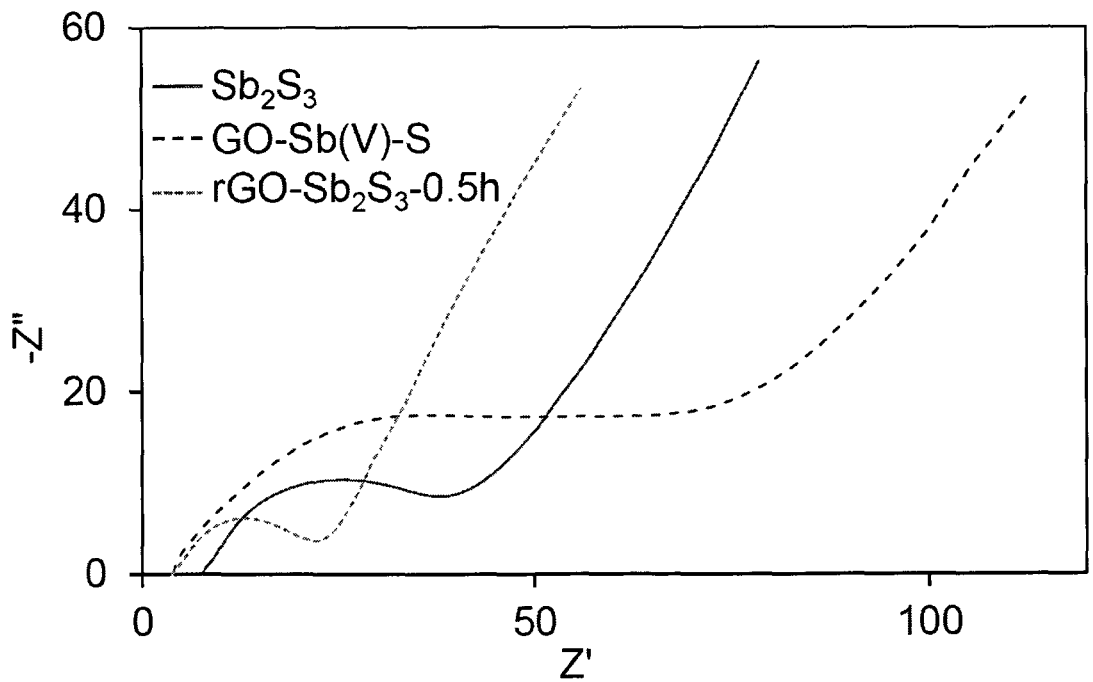
FIG. 8 shows AC impedance profiles of different materials tested at 1.4V vs. Li/Li$^+$.

Charge-transfer resistances of the materials were tested by impedance spectroscopy. The cells were charged to 1.4 V vs. Li/Li$^+$ and held for 2 h to equilibrate the potential. This corresponds to the potential for the Li/S reaction in the system. Impedance was taken with a voltage amplitude of 10 mV from 750 kHz to 5 mHz. The Nyquist plots of the different cells are shown in FIG. 8. Compared to bulk $Sb_2S_3$, the amorphous GO-Sb(V)-S shows larger charge-transfer resistance, which is consistent with the lower conductivity of the material. On the other hand the annealed sample rGO-$Sb_2S_3$-0.5 h shows a reduced charge-transfer resistance, which can explain the enhanced performance with the graphene scaffolding.

In Table 3, sample rGO-$Sb_2S_3$-0.5 h capacity was compared with other samples as follows. Comparative example 1A: Graphene oxide-$Sb_2S_3$ composite was synthesized under the same condition as Example 1, except the final heat treatment step is carried out at 80° C. in vacuum. Comparative example 1B: Commercial $Sb_2S_3$ materials were purchased from Sigma Aldrich and used as it is. Comparative example 1C: Graphene oxide-Sb oxide (GO/SbOx) were synthesized as in Example 1, except without the sulfurization and annealing step.

Figure 9:
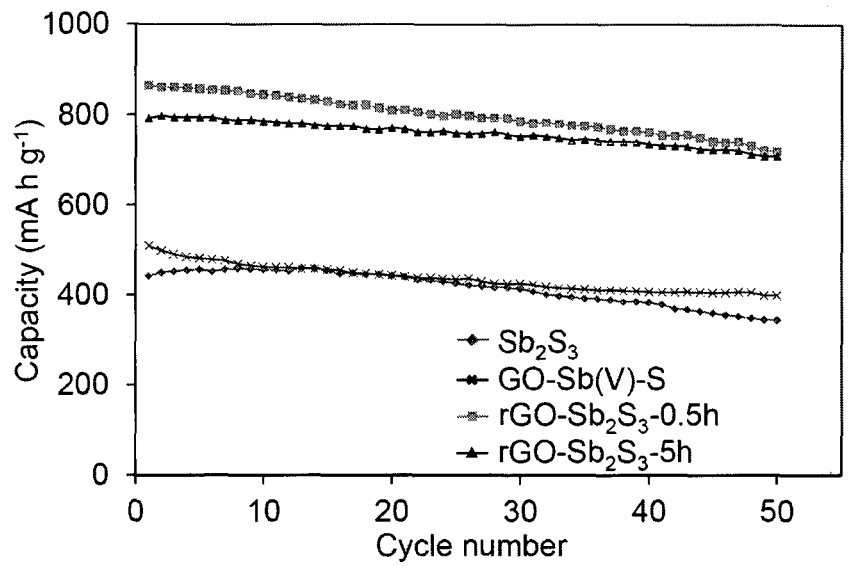
FIG. 9 shows cycle performance at a current rate of 250 mA g$^-$for different samples.

Cycle performance. Cycle performances of the four different samples are shown in FIG. 9. The GO-Sb(V)-S material gives a similar capacity as commercial $Sb_2S_3$, with a capacity of about 450 mA h g$^{-1}$ at 250 mA g$^{-1}$. The annealed samples (rGO-$Sb_2S_3$-0.5 h and rGO-$Sb_2S_3$-5 h) had excellent stability with a much higher capacity, suggesting that the rGO layers are able to provide a good framework to enable large amounts of Li storage in the active material. A charge capacity of more than 720 mA h g$^{-1}$ at a current rate of 250 mA g$^{-1}$ even after 50 cycles is observed. This is the highest capacity reported so far for this material. Despite the much higher current rate that we used in the test, high capacity could be achieved because of the excellent rate capability of the material combining nanoparticles (for fast Li diffusion) and rGO (for good electrical conductivity).

Figure 25:
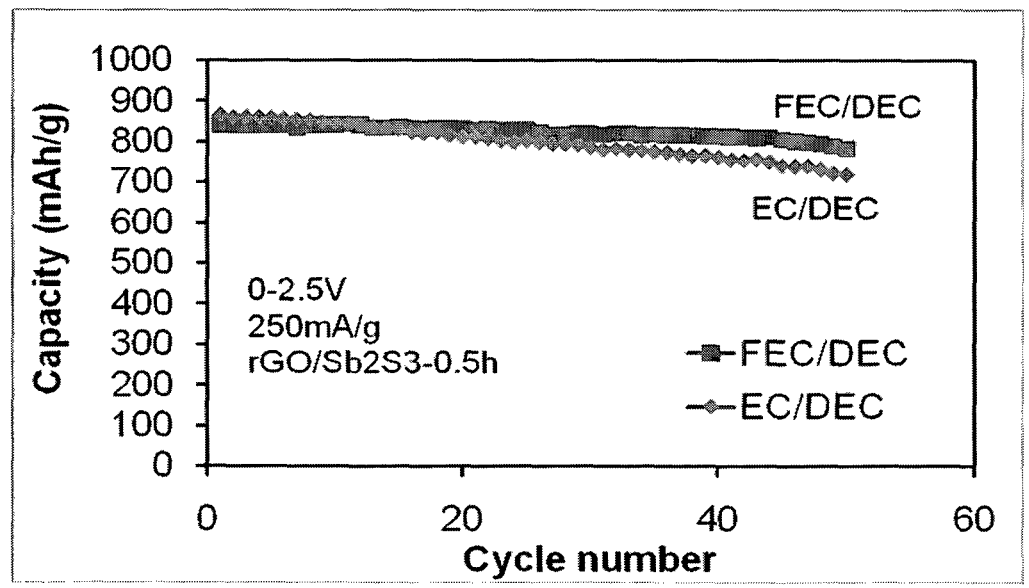
FIG. 25 shows capacity vs. cycle results of rGO-Sb$_2$S$_3$-0.5 h with different electrolytes for LIB.

Testing of rGO-Sb2S3 materials with different electrolytes to further improve cycle performance. Sample rGO-$Sb_2S_3$-0.5 h was tested with different electrolytes as follows. Electrolyte 1: 1M LiPF6 in ethylene carbonate (EC)/diethyl carbonate (DEC)=1:1. Electrolyte 2: 1M LiPF6 in 4-fluoro-1,3-dioxolan-2-one (FEC)/DEC=1:1. Results are shown in Table 4 and FIG. 25. It can be seen that initial charge capacity of about 920-930 mAh g$^{-1}$ can be obtained. Change of electrolyte does not appear to change the capacity. Higher cycle stability is obtained with the use of FEC/DEC electrolyte.

Conclusion

Two significant issues were reported in this example. The first relates to a new synthesis methodology that yielded a material never reported before by surprising heat treatment conversions, and the second relates to the high performance of the reduced graphene oxide supported antimony sulfide nanomaterials.

The preparation route of rGO supported antimony sulfide by sulfurization of peroxoantimonate coated GO was introduced for the first time. Surprisingly, the thermodynamically-allowed sulfidization of the antimony (V) species did not take place at all at 80° C. and only sulfur production was obtained by peroxide oxidation of the sulfide. The thermal reaction of the intimate sulfur and antimony (V) oxide nanoparticles was responsible for antimony sulfide formation. Note that antimony, graphene, hydrogen sulfide and hydrogen peroxide (our precursors) are abundant and cheap materials and the synthesis process does not require sophisticated equipment or an autoclave.

The antimony sulfide coated rGO gave a promising electrochemical performance in terms of capacity, cyclic stability as well as charging rate. Only the combination of nanometric lithiating particulates and thin wall conductive scaffolding could yield such performance.

TABLE 4

Testing of rGO-Sb2S3 materials with different electrolytes

| Electrolyte | | $1^{st}$ charge capacity (mAh/g) | $1^{st}$ cycle efficiency (%) | Cycle stability (%) |
|---|---|---|---|---|
| Example 1 | 1M LiPF6 EC/DEC = 1:1 | 931.4 | 76.9 | 82.0 |
| Example 2 | 1M LiPF6 FEC/DEC = 1:1 | 921.9 | 71.8 | 93.1 |

Cycle stability = remaining capacity after 50 cycles at 250 mA/g as compared to the first cycle at 250 mA/g

TABLE 1

Composition and characteristics of the electrochemically studied samples.

| Electrode material | C/Sb atomic ratio (by EDX) | Carbon content, % wt. (by elemental analysis) | S/Sb atomic ratio (by EDX) | I(D)/I(G) ratio (by Raman) | Crystallite size, nm (by Scherrer equation) | $Sb^{III}/Sb^{V}$ ratio (by XPS) |
|---|---|---|---|---|---|---|
| GO-Sb(V)-S | 17.1 | 14.8 | 2.59 | 1.32 | Amorphous | 0 |
| rGO-$Sb_2S_3$-0.5h | 7.0 | 17.6 | 1.54 | 1.20 | 19 | 2.0 |
| rGO-$Sb_2S_3$-5h | 8.7 | 16.5 | 1.44 | 1.09 | 16 | 2.5 |

TABLE 2

Recorded capacities of different samples.

| | 1st discharge capacity (100 mA $g^{-1}$), mA h $g^{-1}$ | 1st charge capacity, mA h $g^{-1}$ | 1st cycle efficiency |
|---|---|---|---|
| $Sb_2S_3$ | 858.2 | 457.4 | 53.3% |
| GO-Sb(V)-S | 1076.2 | 641.8 | 59.6% |
| rGO-$Sb_2S_3$-0.5 h | 1210.9 | 931.4 | 76.9% |
| rGO-$Sb_2S_3$-5 h | 1139.4 | 865.1 | 75.9% |

TABLE 3

Recorded capacities of different samples (II)

| | | $1^{st}$ charge capacity (mAh/g) | $1^{st}$ cycle efficiency (%) | Rate performance (%) | Cycle stability (%) |
|---|---|---|---|---|---|
| Example 1 | rGO/Sb2S3 | 931.4 | 76.9 | 78.0 | 82.0 |
| Comparative example 1A | GO/Sb2S3 | 641.8 | 59.6 | 53.4 | 79.8 |
| Comparative example 1B | Sb2S3 | 457.4 | 53.3 | 47.9 | 77.9 |
| Comparative example 1C | GO/SbOx | 308.6 | 27.4 | 26.3 | 74.5 |

Example 2

Novel Anode for Na-ion Batteries with Excellent Cycle and Rate Capability: $Sb_2S_3$ Nanoparticle Decorated Graphene Composite Graphene with a uniform coating of $Sb_2S_3$ was fabricated by a solution-based synthesis technique. The material shows high capacity of 730 mAh $g^{-1}$ at a rate of 50 mA $g^{-1}$, with excellent rate capability up to 6 C and good cycle performance as anode materials for sodium ion batteries. The excellent performance is attributed to the small nanoparticles of $Sb_2S_3$ that allow fast Na ion diffusion, and the intimate contact between the active material and graphene, which provides good electrical transport as well as a template for anchoring the nanoparticles. This is the first time that this metal sulfide demonstrates such a high capacity and rate performance for sodium ion batteries. This opens up the door for a variety of metal-sulfide graphene-composite as anodes for sodium ion batteries.

Figure 10:
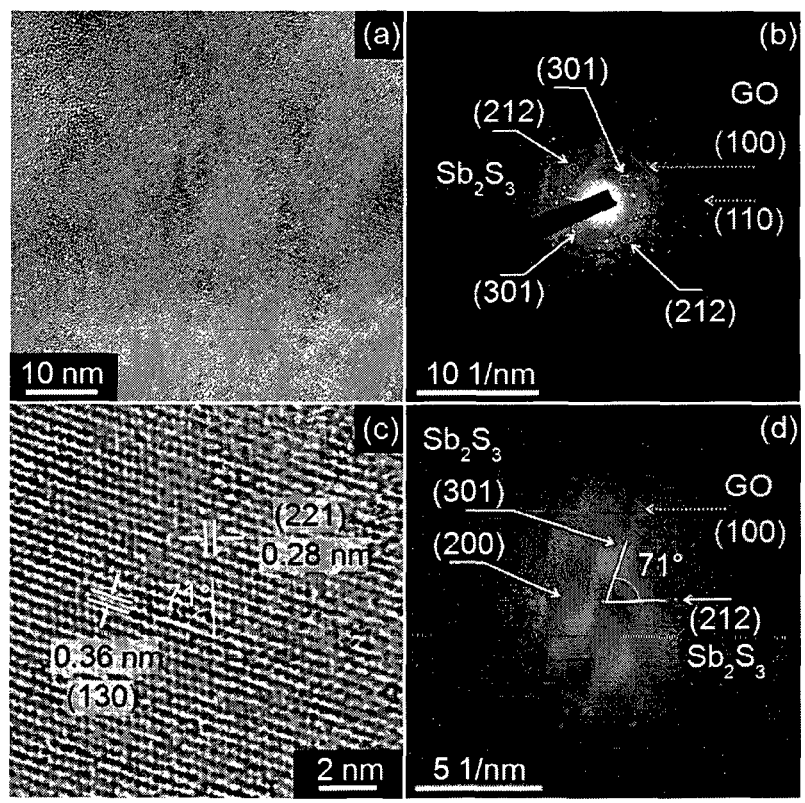
FIG. 10 shows TEM image of antimony sulfide coated graphene oxide (a), and the corresponding SAED pattern. Magnified section of the TEM image with the corresponding crystal lattice fringes (c). Fast Fourier transform of the TEM image is depicted in frame (d).

In this example, we developed a chemical synthesis routine via the deposition of peroxoantimonate from hydrogen peroxide-rich solution and its subsequent sulfurization with hydrogen sulfide to form a conformal coating of nanocrystallite stibnite ($Sb_2S_3$) onto reduced graphene oxide (rGO). The composite material performs extremely well as the anode for Na-ion battery. About 9.2 Na (730 mAh $g^{-1}$) can be reversibly inserted and removed from the material at a rate of 50 mA $g^{-1}$ (about 0.067 C). The material retains its charge capacity even at higher current rate. When the current rate is increased to 1500 mA $g^{-1}$ (about 2.5 C), charge capacity of 610 mAh $g^{-1}$ can be obtained. Even when the current is increased to 3000 mA $g^{-1}$, more than 70% of the capacity (520 mAh $g^{-1}$) can still be used. This corresponds to a charge and discharge time of 10 minutes. This is the first time a capacity of above 500 mAh g$^{-1}$ can be obtained from a NIB anode material within 10 minutes. In addition to the excellent rate capability, the material also shows stable cycle performance. Capacity retention is more than 95% after 50 cycles at 50 mA g$^{-1}$. The enhanced rate capability and cycle stability of the materials is attributed to intimate contact of the stibnite to the reduced graphene sheets (FIG. 10) that provide a structure for electrical conductivity as well as a platform for anchoring the nanoparticles. Further development of the material may lead to high capacity and high power NIB in the future.

Methods

Synthesis and characterization of rGO/Sb$_2$S$_3$. Details of the material synthesis are described in Example 1 and each intermediate was carefully characterized. Briefly, the synthesis is based on the dissolution of antimony hydroxide in aqueous tetramethylammonium hydroxide under moderate heating and addition of this precursor to aqueous GO dispersion in 20% hydrogen peroxide. Precipitation of the resulting peroxoantimonate onto the GO surface was achieved by addition of ethanol-diethyl ether antisolvent mixture. The peroxoantimonate@GO was sulfurized in alcohol suspension, without reduction of the Sb(V) or formation of antimony sulfide, by bubbling hydrogen sulfide. The sulfur-coated antimony (V) oxide@GO was washed and heat-treated in vacuum at 300° C. in a tube furnace for 5 hours to form the rGO/Sb$_2$S$_3$ composite. The as-synthesized materials were characterized by powder X-ray diffraction (XRD) to confirm the crystalline Sb$_2$S$_3$ formation. The carbon content of the composite determined by elemental analysis is 17 wt %.

Electrode Fabrication. Both commercial bulk Sb$_2$S$_3$ (Sigma-Aldrich) and rGO/Sb$_2$S$_3$ were used as the active materials. Each material was mixed together with acetylene black (Alfa Aesar) and carboxymethyl cellulose sodium salt (CMC, Sigma-Aldrich) in de-ionized water in a weight ratio of 6:2:2 to make a slurry. The slurry was then coated on copper current collector to make an electrode. The electrode was compressed by a roll press, dried at 110° C. for 4 hours in vacuum, and then made into 2016 coin cells for testing. Typical thickness of the electrodes is 25-30 μm with a packing density of about 1 g cm$^{-3}$. 1M NaClO$_4$ in propylene carbonate (PC) with 5 wt % fluorinated ethylene carbonate (FEC) was used as the electrolyte. Other fluorinated electrolyte additives such as difluorinated ethylene carbonate (DFEC), fluorinated diethyl carbonate (FDEC), fluorinated dimethyl carbonate (FDMC) can also be used. Reference electrodes with Cu:AB:CMC and graphene:AB:CMC=6:2:2 were also tested for comparison.

Results

The rGO/Sb$_2$S$_3$ composite featured in this example was fabricated by sulfurization of peroxoantimonate coated GO in alcohol and subsequent vacuum annealing at 300° C. Formation of crystalline Sb$_2$S$_3$ was confirmed by X-ray diffraction analysis. The amount of carbon content in the composite is determined to be about 17 wt % by elemental analysis.

FIGS. 10(a)-(d) shows the transmission electron microscopy (TEM) micrograph of the as-synthesized Sb$_2$S$_3$-coated graphene oxide (a). The selected area electron diffraction shows the diffraction pattern of polycrystalline Sb$_2$S$_3$ with the characteristic pattern of stibnite. Fast Fourier Transform (FFT) of the HRTEM of Sb$_2$S$_3$ is shown in frame (d), with the few diffraction planes of stibnite. The diffraction patterns of the graphene oxide are clearly shown in the FFT as well as in the SAED diffraction pattern. The crystalline size as deduced from TEM studies is between 15 and 30 nm and the average crystallite size of antimony sulfide calculated by Scherrer equation based on the X-ray powder diffraction is 16 nm.

Electrodes were made by mixing active materials with acetylene black and carboxymethyl cellulose sodium salt in de-ionized water in the ratio 6:2:2. The electrode was made into 2016 coin cells with sodium metal as the counter electrode. 1M NaClO$_4$ in propylene carbonate (PC) with 5 wt % fluorinated ethylene carbonate (FEC) was used as the electrolyte. FEC was added to improve the stability of the material with cycling.

Figure 11:
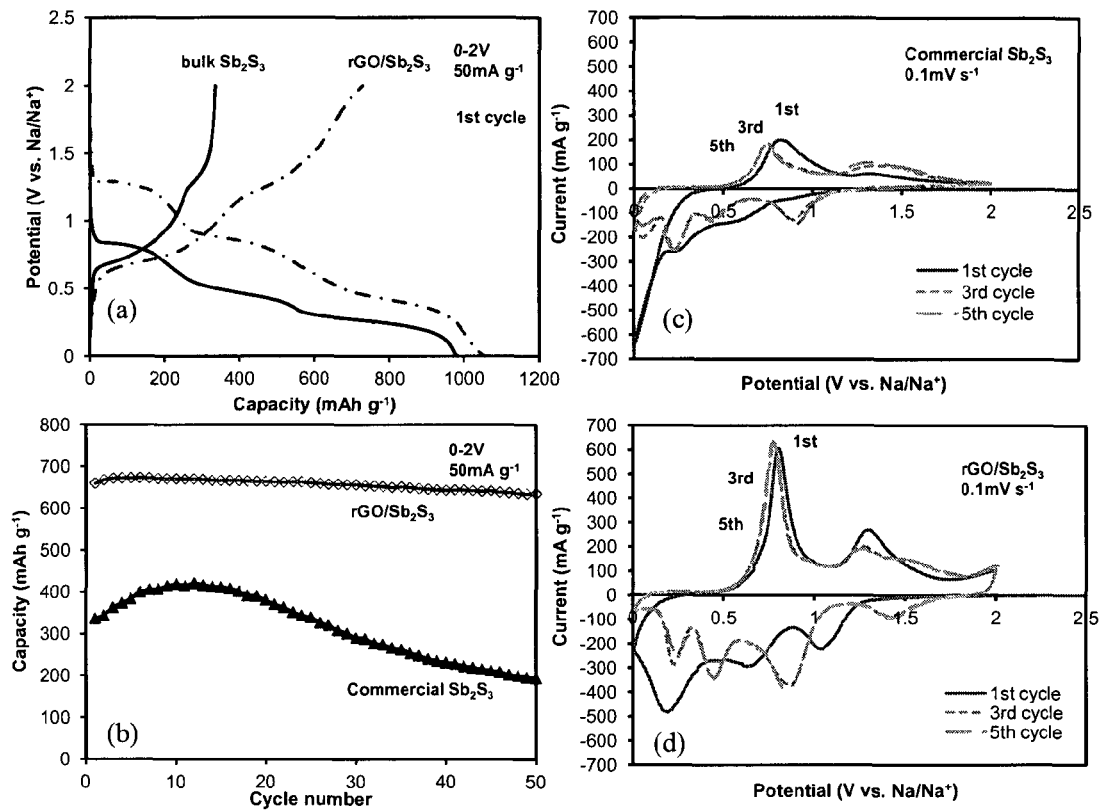
FIG. 11 shows electrochemical performance of bulk Sb$_2$S$_3$ and rGO/Sb$_2$S$_3$ (a) First cycle charge-discharge profiles at 50 mA g$^{-1}$; (b) Cycle performance at 50 mA g$^{-1}$; (c) Cyclic voltammogram of bulk Sb$_2$S$_3$; (d) Cyclic voltammogram of rGO/Sb$_2$S$_3$.

To understand the contribution from carbon black, binder and graphene on the measured capacity, reference electrodes with Cu:AB:CMC=6:2:2 and graphene:AB:CMC=6:2:2 were also tested under the same condition. In addition, bulk Sb$_2$S$_3$ from Sigma-Aldrich with a particle size of about 10 μm was also tested for comparison.

rGO/Sb$_2$S$_3$ electrodes show a first discharge capacity of 1050 mAh g$^{-1}$ (FIG. 11(a)). Only a small contribution of the discharge capacity is due to graphene (162 mAh g$^{-1}$), carbon black and binder (43 mAh g$^{-1}$). Thus, the capacity originates from insertion of Na into Sb$_2$S$_3$ is 845 mAh g$^{-1}$, which is close to full utilization of the Sb$_2$S$_3$ active material. On the other hand, first charge capacity of rGO/Sb$_2$S$_3$ is 730 mAh g$^{-1}$, out of which only 38 mAh g$^{-1}$ and 8 mAh g$^{-1}$ come from graphene and carbon black, respectively. Overall, the first cycle efficiency of the rGO/Sb$_2$S$_3$ electrodes is 69.2%, which is higher than that of metal oxides such as SnO$_2$. 9.2 Na can be reversibly inserted and extracted from the electrode during charge and discharge. In contrast, commercial bulk Sb$_2$S$_3$ (Sigma-Aldrich) with a particle size of about 10 μm shows a first cycle discharge and charge capacity of 980 mAh g$^{-1}$ and 337 mAh g$^{-1}$, respectively, corresponding to a first cycle efficiency of 34.4% (see FIG. 11(a)). rGO/Sb$_2$S$_3$ shows a much higher reversible capacity than bulk Sb$_2$S$_3$ even though the first discharge capacity is similar.

To understand the main difference between rGO/Sb$_2$S$_3$ and bulk Sb$_2$S$_3$ electrodes, cyclic voltammetry at a scan rate of 0.1 mV s$^{-1}$ were carried out on the two electrodes. Results are shown in FIGS. 11(c) and 11(d). The profiles during 1$^{st}$ cycle for both electrodes are distinctively different from subsequent cycles, suggesting that there is an activation step during first discharge. During second and subsequent cycles, both bulk Sb$_2$S$_3$ and rGO/Sb$_2$S$_3$ electrodes show reduction peaks around 0.25, 0.45 and 0.9 vs. Na/Na$^+$ and oxidation peaks around 0.73 and 1.3V vs. Na/Na$^+$. The reduction and oxidation potentials at 0.25/0.45 and 0.73V agree well with the potential positions of alloying of Sb with Na. The potential pair at 0.9/1.3V is attributed to conversion reaction with sulfur atoms in the material. rGO/Sb$_2$S$_3$ shows enhanced reaction currents for both alloying and conversion reactions, which is the main reason the overall reversible capacity is higher. The role of graphene on the electrochemical performance was investigated by comparing the activity of nano-crystalline Sb$_2$S$_3$ without graphene (n-Sb$_2$S$_3$) synthesized by a co-precipitation method with rGO/Sb$_2$S$_3$ and bulk Sb$_2$S$_3$. n-Sb$_2$S$_3$ shows a first cycle charge capacity of 503 mAh g$^{-1}$, larger than the charge capacity of bulk Sb$_2$S$_3$ but smaller than that of rGO/Sb$_2$S$_3$. Reversible capacity is higher by reducing the particle size, but graphene templating is needed to further enhance the reversible capacity from the reaction by allowing more effective de-alloying and recombination of the metal-sulfide during sodium removal.

FIG. 11(b) shows the cycle performance of both bulk Sb$_2$S$_3$ and rGO/Sb$_2$S$_3$ at a current rate of 50 mA g$^{-1}$. Capacity of bulk Sb$_2$S$_3$ increases from 337 mAh g$^{-1}$ to 419 mAh g$^{-1}$ during the first 10 cycles, but decreases afterwards to less than 200 mAh g$^{-1}$ after 50 cycles, less than 50% of the maximum capacity. The increase in capacity during the initial 10 cycles for bulk Sb$_2$S$_3$ is accompanied by a cycle efficiency of above 100%, meaning that this is due to an increase in extraction of Na from the electrode that is originally inserted during first discharge. However, cycle efficiency settles down to about 97.2% with prolonged cycling, and the capacity reduction is caused by the loss of active material. In contrast, rGO/Sb$_2$S$_3$ shows a capacity of about 670 mAh g$^{-1}$, with a capacity retention of more than 95% after 50 cycles. Cycle efficiency is about 98.7% for rGO/Sb$_2$S$_3$, suggesting less loss per cycle compared to bulk material.

Figure 12:
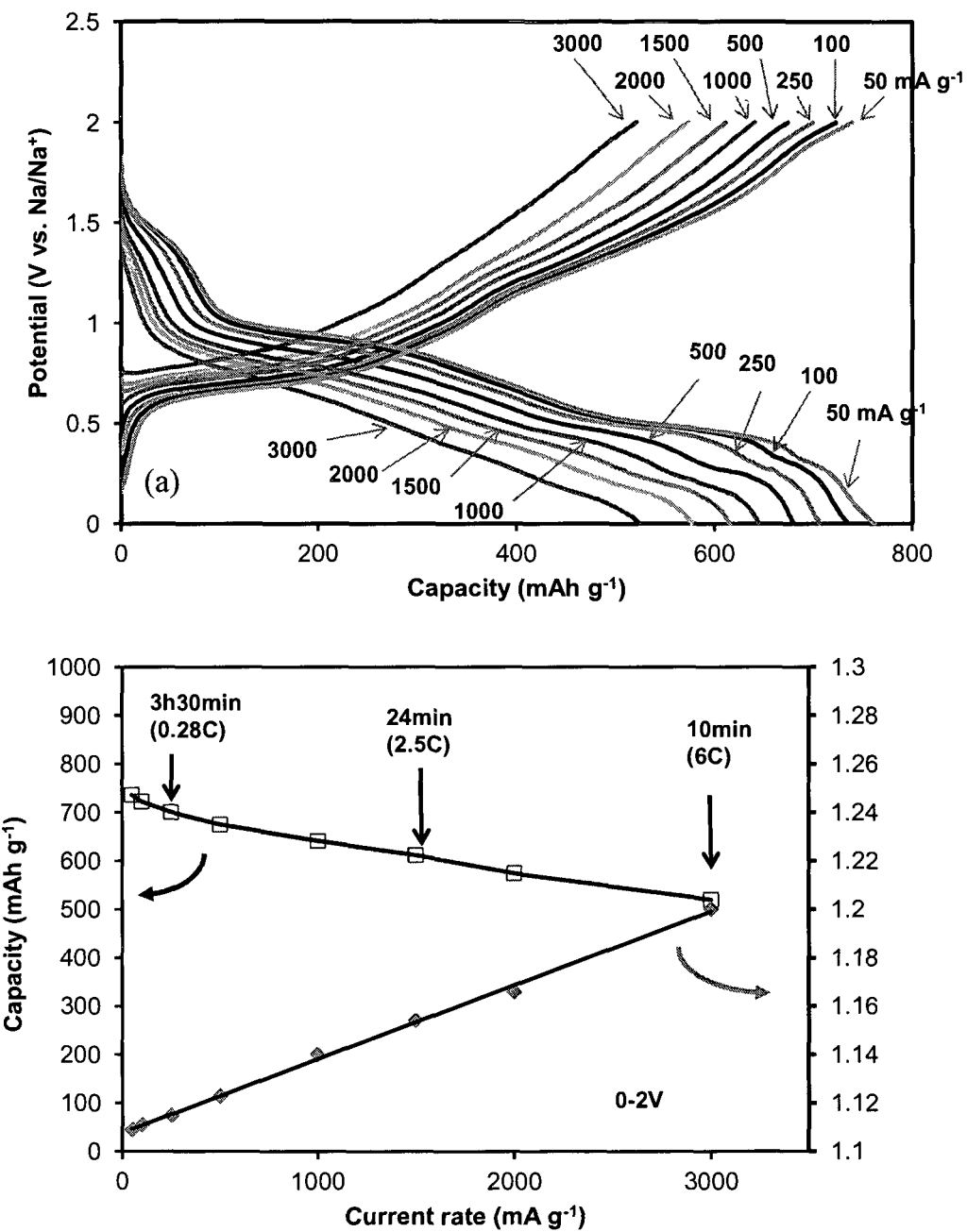
FIG. 12 shows (a) Rate performance of rGO/Sb$_2$S$_3$ and (b) respective capacity and average charge potential at different current rates.

In addition to the excellent cycle stability, rGO/Sb$_2$S$_3$ also shows good high-rate capability. The electrode was discharged and charged at a rate of 50, 100, 250, 500, 1000, 1500, 2000 and 3000 mA g$^{-1}$ for 5 cycles each. After the rate test, the electrode was tested again at 50 mA g$^{-1}$ to investigate the effect of rate test on the stability of the electrode. The charge capacities at different current rates are summarized in FIG. 12(b). In additional to the high capacity at low rate, a charge capacity of 611 mAh g$^{-1}$ can be obtained at a current rate of 1500 mA g$^{-1}$, which corresponds to a charge and discharge time of about 24 mins (2.5 C). When the current rate is increased to 3000 mA g$^{-1}$, a capacity of 520 mAh g$^{-1}$ can still be obtained (>70% of the available 730 mAh g$^{-1}$ at low current rate). This corresponds to a charge and discharge time of 10 mins (6 C), sufficient for high rate applications such as electric vehicles and power tools. The high rate-capability indicates that the electrode materials allow fast transfer of Na and electrons through our material design. FIG. 12(a) shows selected charge-discharge curves at different current rates. There is minimal increase in polarization even at high current rate of 3000 mA g$^{-1}$, suggesting good electrical connectivity with the graphene template. Average charge potentials of the electrode at different current rates are shown in FIG. 12(b), indicating that the working potential only increases by 0.05V when the current is increased from 50 mA g$^{-1}$ to 1500 mA g$^{-1}$, an increase of 30 times the current and by 0.1V when the current is increased to 3000 mA g$^{-1}$. The stability of the electrode was verified again after rate test. When the current rate is reduced back to 50 mA g$^{-1}$ after the rate test, the initial capacity is restored.

Discussions

Figure 13:
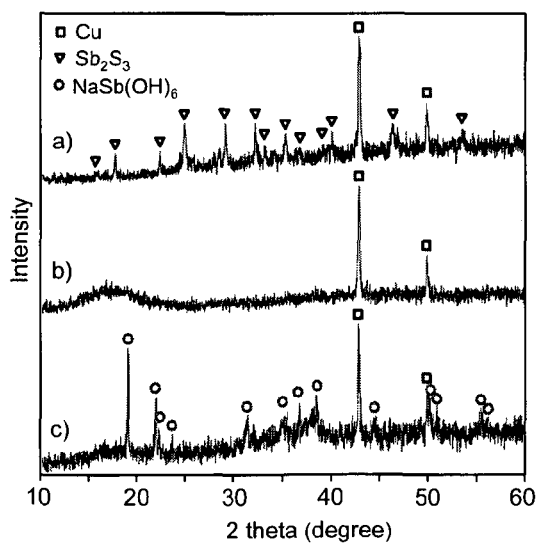
FIG. 13 shows X-ray diffractograms of as-coated anode (a), discharged to 0V (b), and discharge to 0V then exposed in air for 48 hours (c).

The intimate contact between the antimony sulfide and the reduced graphene oxide is partly responsible for the enhanced behavior of the NIB anode. The small polarization at high current rate is an indication of good electronic connectivity within the graphene-composite. The small particle size (15-30 nm from TEM) allows fast Na movement into and out of the particles during charge and discharge. To further elucidate the charge-discharge process, X-ray diffraction (XRD) and scanning electron microscopy (SEM) of the electrodes were taken at different states of charge during 1$^{st}$ cycle: (i) half discharged to 1V; (ii) fully discharged to 0V; (iii) fully discharged to 0V and then charged to 2V. The cells were then disassembled in a glove box, washed with dimethyl carbonate (DMC) to remove the salt, and then sealed in wax for XRD measurement. FIG. 13 shows the XRD results for the as-coated electrode (a) and the one discharged to 0V (b). The as-coated electrode shows crystalline Sb$_2$S$_3$ diffraction pattern. When the electrode is discharged, no crystalline phase can be observed, suggesting that the material becomes amorphous. No crystalline phase is observed also for the electrode half discharged to 1V (case (i)), and the electrode fully discharged to 0V and then charged to 2V (case (iii)), suggesting breakdown of the crystal structure after charge and discharge. If the discharged electrode (to 0V) is exposed to air for 48 hours (FIG. 13(c)), crystalline peaks corresponding to NaSb(OH)$_6$ appears, which is due to reaction between the discharged material with water and oxygen in the atmosphere. This indicates that Na is incorporated in the electrode after discharging.

Figure 14:
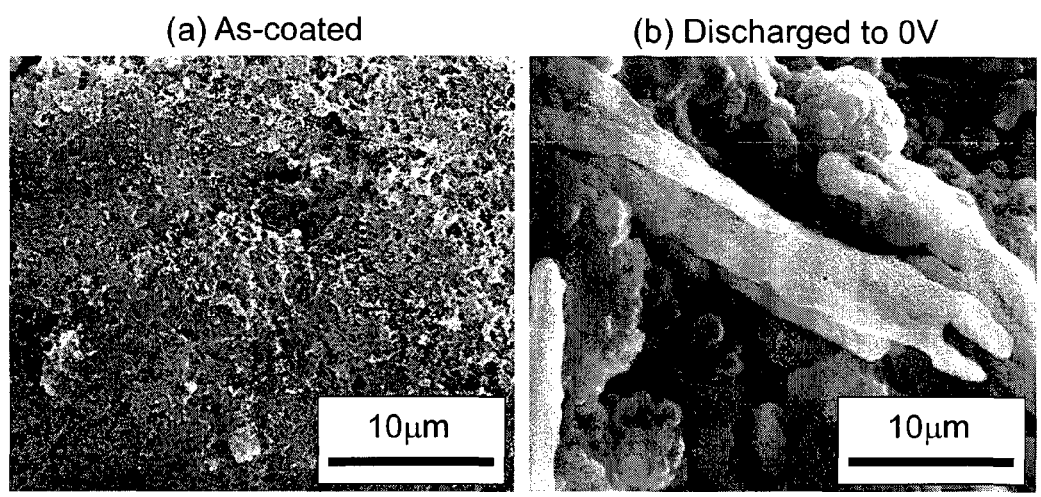
FIG. 14 shows SEM images of the surface of the as-coated electrodes (a) and the electrode discharged to 0 V (b).

SEM images of the as-coated and discharged electrodes are shown in FIG. 14. The as-coated electrode (FIG. 14(a)) shows some small particles on the surface, which is identified as elemental sulfur from EDX. During the synthesis process, a small amount of residual sulfur is produced as a by-product, as suggested by previous XPS measurements. Upon discharging to 0V, large elongated particles are observed on the electrode (FIG. 14(b)). EDX analysis shows the particles have an atomic ratio of Na to S of 2:1, consistent with the formation of Na$_2$S from the reaction mechanism.

In summary, by anchoring Sb$_2$S$_3$ nanocrystalline on graphene sheet, we were able to design an excellent anode material for Na-ion batteries that combines both the high capacity offered by Sb$_2$S$_3$ as well as the stable cycle performance and good rate performance from the graphene template. Capacity and rate capability are the highest so far recorded for anodes in sodium ion batteries.

Example 3

Tin Sulfide @ Graphene Oxide as Anode for Lithium and Sodium Ion Batteries

In this example, we have synthesized a uniform coating of nanocrystalline SnS$_x$ on graphene with a solution-based method. The material was tested in both LIB and NIB. The same tin sulfide material shows higher capacity for lithium reaction compared to sodium reaction. However, relative rate performance is much higher for sodium reaction.

Experimental

Electrochemical Studies. Two tin sulfide samples were selected for electrochemical evaluation. Sample annealed at 80° C. in vacuum for 5 hours (GO-SnS-80) and sample annealed at 300° C. in vacuum for 5 hours (rGO-SnS-300). In the following, we use the same nomenclature for the active electrode material and the anode that was made from it.

Electrochemical evaluation. Each of the different materials was mixed with acetylene black and carboxymethylcellulose sodium salt (CMC, Sigma-Aldrich) in a weight ratio of 6:2:2 with deionized water as the medium to form a slurry. The slurry was then coated on roughened copper foil as a current collector using a doctor's blade. The electrode was then dried at 80° C. and pressed in a roll press. The electrodes were cut into 16 mm diameter discs and further dried at 110° C. for 4 hrs in vacuum before being introduced into an argon-filled glove box. For lithium-ion batteries, the electrodes were assembled with Li metal as counter electrodes in a 2016 coin cell. 1 M lithium hexafluorophosphate (LiPF$_6$) in fluorinated ethylene carbonate (FEC)-diethyl carbonate (DEC) 1:1 solution was used as electrolyte. The cells were then tested with a battery tester between 0 to 2.5 V vs. Li/Li$^+$. The typical charge-discharge rate was 100 mA g$^{-1}$ during the first five cycles and 250 mA g$^{-1}$ for subsequent cycles. Cyclic voltammetry (CV) profiles were taken at a scan rate of 0.1 mV s$^{-1}$ between 0.005 V and 3 V vs. Li/Li$^+$. Rate performance was measured by testing the cell at current rates of 100, 250, 500, 1000, 1500 and 2000 mA g$^{-1}$. For sodium-ion batteries, the electrodes were assembled with Na metal as counter electrodes in a 2016 coin cell. 1 M sodium perchlorate (NaClO$_4$) in propylene carbonate (PC) with 5% fluorinated ethylene carbonate (FEC) additive was used as electrolyte. Specific capacities recorded in this paper are calculated with respect to the mass of the SnS$_2$/GO composite (i.e. 60% of the electrode mass).

Results And Discussion

Figure 15:
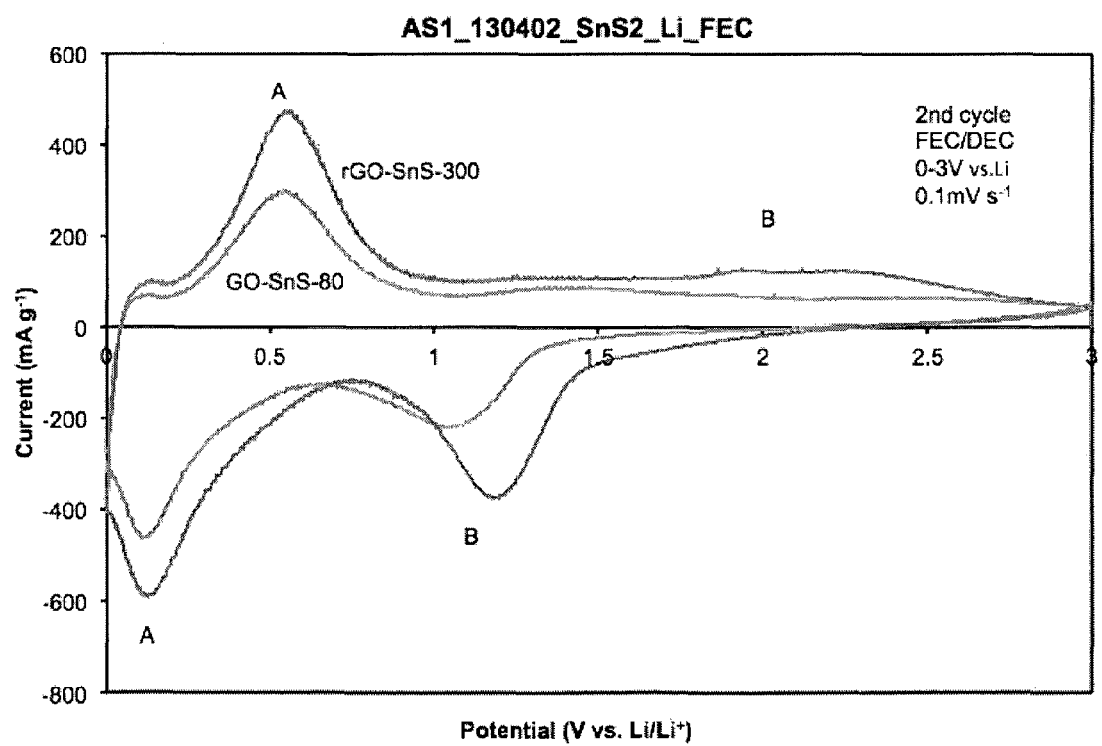
FIG. 15 shows cyclic voltammograms during second cycle of GO-SnS-80 and rGO-SnS-300 electrodes.

Electrochemical Evaluation—LIB. Both GO-SnS-80 and rGO-SnS-300 were first tested as anodes for LIB. Cyclic voltammograms during second cycle of both electrodes are shown in FIG. 15 to study the reaction mechanism. Two distinctive reduction peaks can be observed for both materials, while only one main peak around 0.5V and a relatively constant signal at higher potential is observed during charging. The peaks "A" is attributed to alloying reaction between Li and Sn, where as the peaks "B" are from the conversion reaction between SnS$_2$ and Li. Current from GO-SnS-80 is lower than that of rGO-SnS-300, indicating that the capacity is smaller. This is verified by constant current charge-discharge tests.

Figure 16:
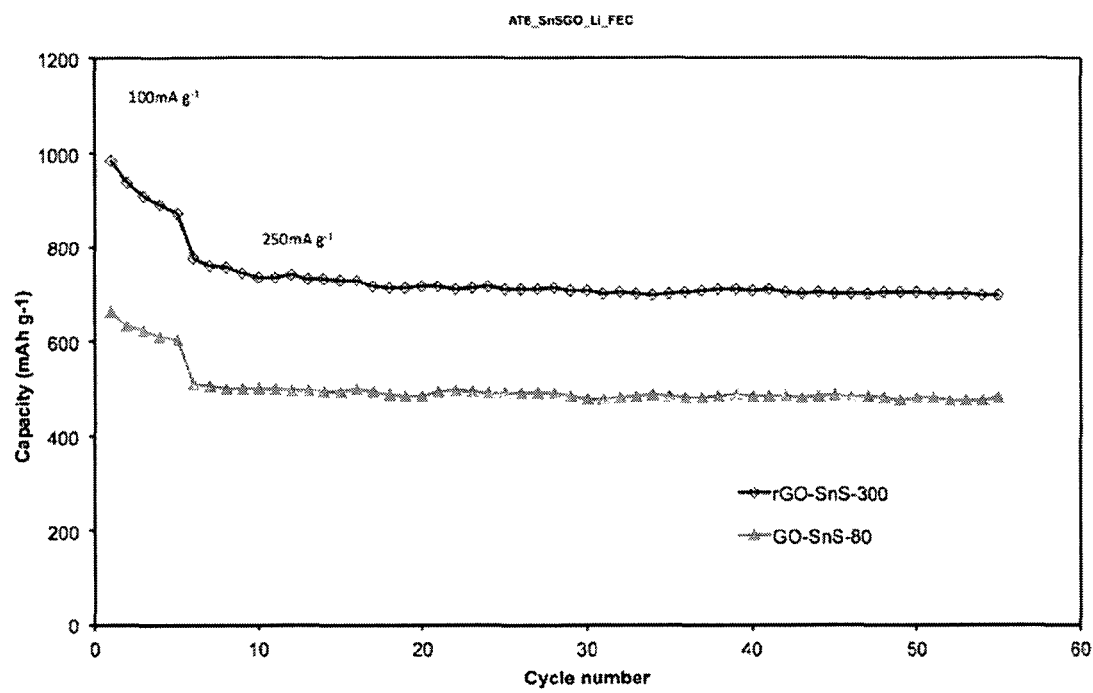
FIG. 16 shows charge capacity at a rate of 100 mA g$^{-1}$ for GO-SnS-80 and rGO-SnS-300.
Figure 17:
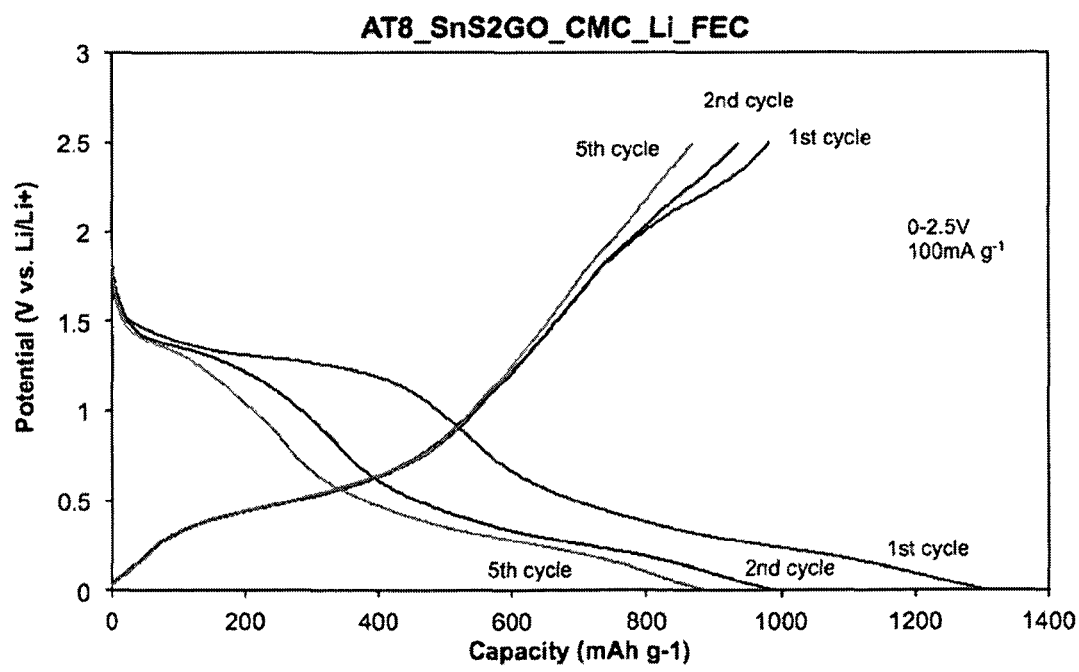
FIG. 17 shows a plot of the charge-discharge curves for rGO-SnS-300 during the first 5 cycles.

Initial charge capacity at a rate of 100 mA g$^{-1}$ for GO-SnS-80 and rGO-SnS-300 are 983 and 664 mAh g$^{-1}$, respectively, showing higher capacity from the sample annealed at 300° C. This is reasonable because of the lower conductivity of the graphene and the higher amount of residual oxygen in the GO-SnS-80 material. During the first 5 cycles at 100 mA g$^{-1}$, capacity drop from both materials can be observed (see FIG. 16). A plot of the charge-discharge curves for rGO-SnS-300 during the first 5 cycles is shown in FIG. 17. One can observe that the reduction in capacity is mainly above 2V, indicating partially irreversible reaction from the conversion reaction SnS$_2$/Li>2V with cycling. After 20-30 cycles, the capacity of the electrodes stabilizes at around 480 and 730 mAh g$^{-1}$ at a rate of 250 mA g$^{-1}$ for GO-SnS-80 and rGO-SnS-300, respectively.

Figure 18:
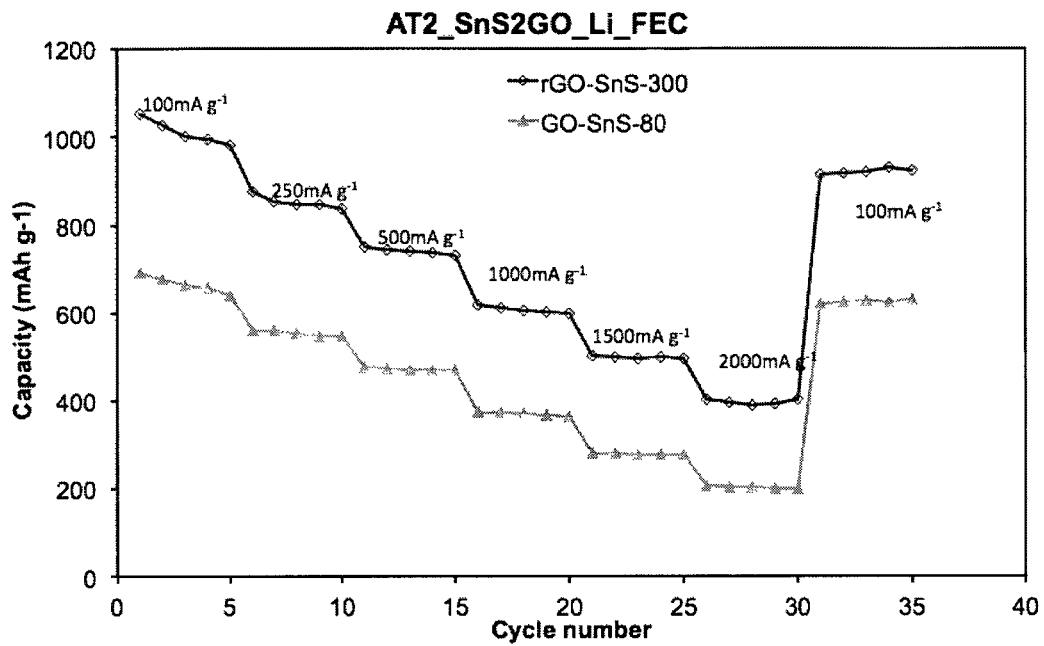
FIG. 18 shows rate performances of GO-SnS-80 and rGO-SnS-300 tested from 100 mA g$^{-1}$ up to 2000 mA g$^{-1}$.
Figure 19:
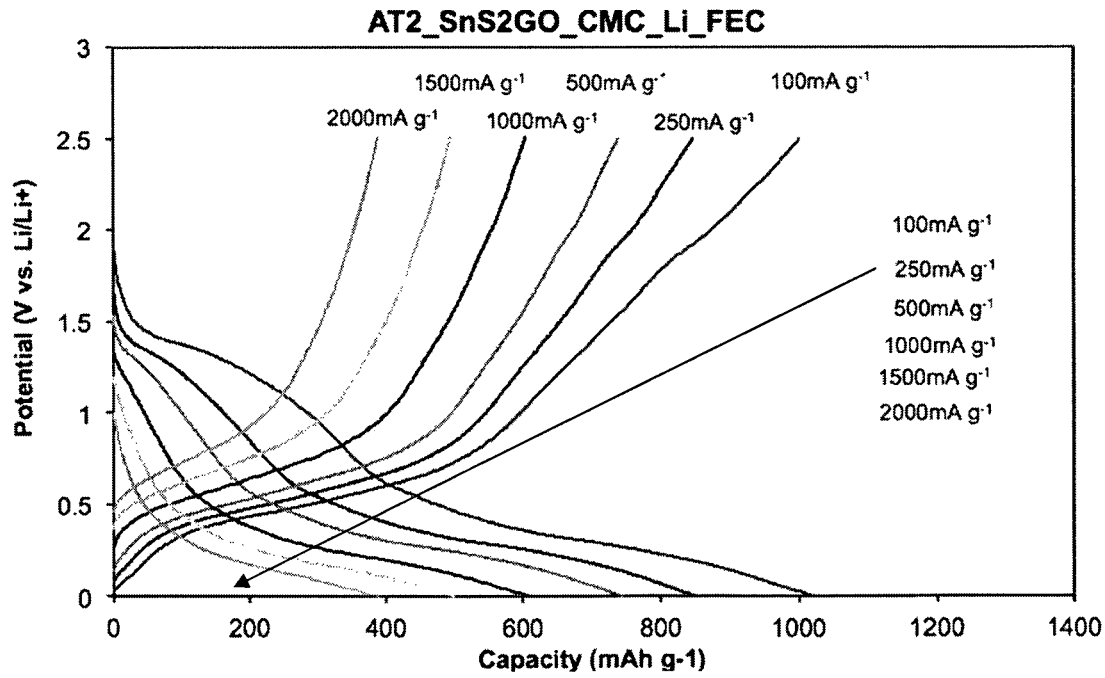
FIG. 19 shows charge-discharge curves of GO-SnS-80 and rGO-SnS-300 at different current rates.

Rate performances of the materials were also tested from 100 mA g$^{-1}$ up to 2000 mA g$^{-1}$. Results are shown in FIG. 18. rGO-SnS-300 shows good rate performance with a capacity of about 395 mAh g$^{-1}$ at 2000 mA g$^{-1}$. Relative rate performance (defined here as the ratio of the capacity at a rate of 2000 mA g$^{-1}$ to that at 100 mA g$^{-1}$) is about 30.5% and 39.5% for GO-SnS-80 and rGO-SnS-300, respectively, indicating better rate capability after the annealing process. Charge-discharge curves at different current rates are shown in FIG. 19. During discharge at low current rate, two distinct regions (0.5-1.4V and 0-0.5V) can be observed, corresponding the conversion reaction and alloying reaction. At a high current rate, most of the overall capacity comes from the lower region, suggesting that conversion reaction is the rate-limiting step in the SnS$_2$/GO in LIB applications.

In summary, higher capacity from sample annealed at 300° C. compared to 80° C. is achieved. Both SnS/Li conversion reaction and Sn/Li alloy reaction are observed. Initial decrease in capacity may be due to partially irreversible reaction from SnS/Li>2V. Stable cycle capacity of about 730 mAh g$^{-1}$ can be obtained at 250 mA g$^{-1}$. Good rate performance with capacity about 395 mAh g$^{-1}$ at 2000 mA g$^{-1}$ is achieved.

Figure 20:
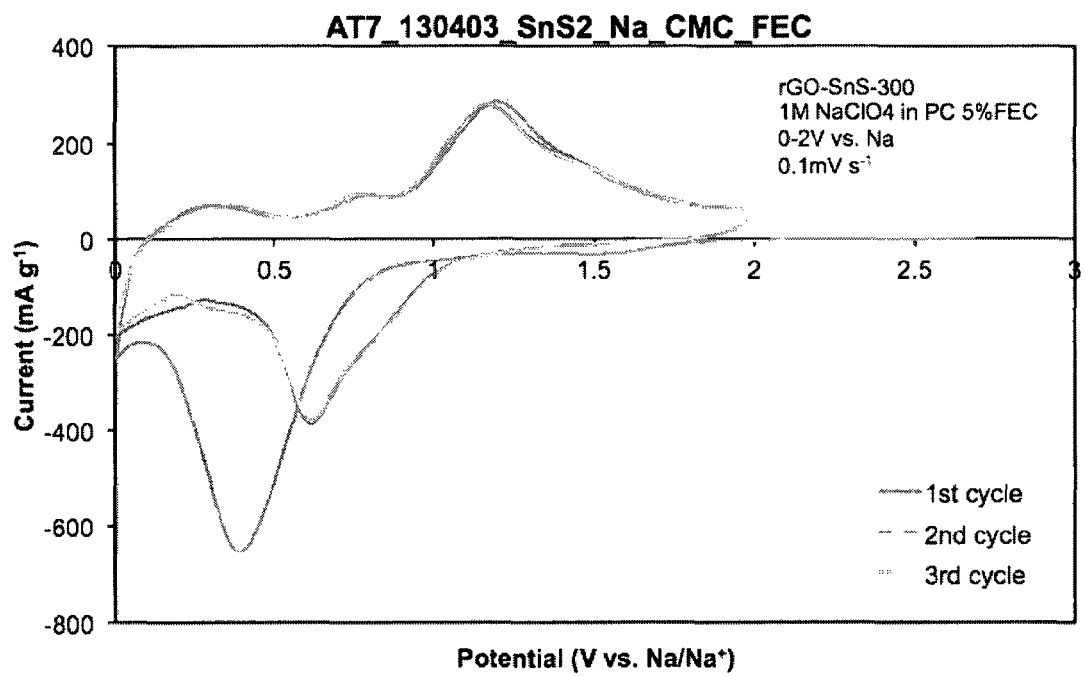
FIG. 20 shows cyclic voltammograms of rGO-SnS-300 vs. Na/Na$^+$.
Figure 21:
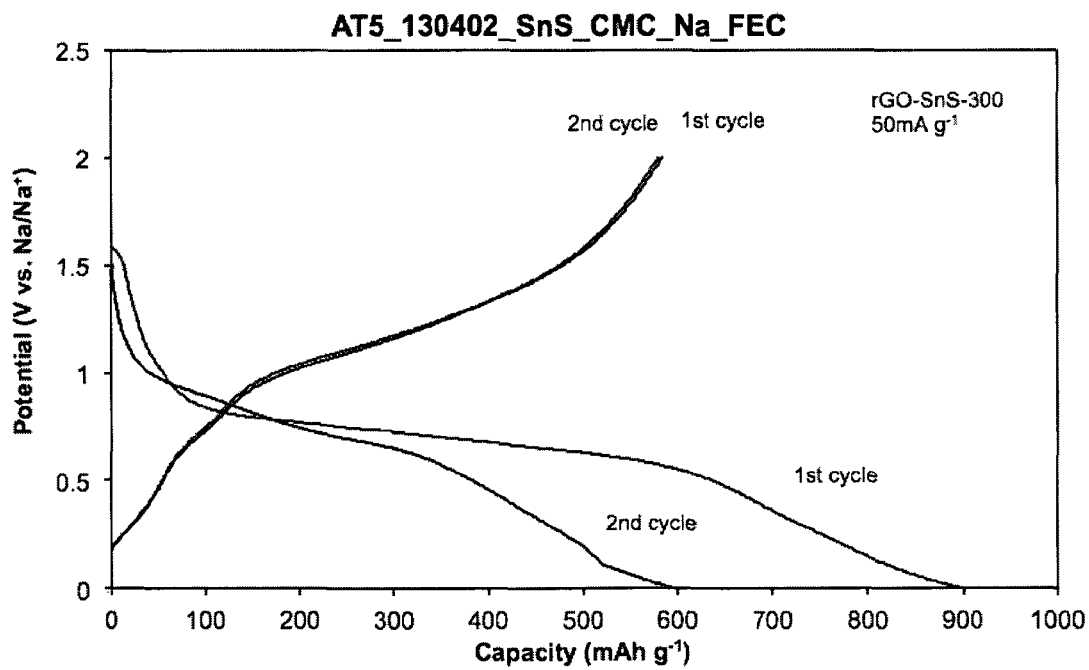
FIG. 21 shows charge-discharge curves rGO-SnS-300 in NIB at 50 mA g$^{-1}$.

Electrochemical Evaluation—NIB. To compare the reaction mechanism between SnS$_2$/Li and SnS$_2$/Na, the same electrode rGO-SnS-300 was tested with Na counter electrode with Na-based electrolyte. Alloying mechanism between Sn and Na was previously reported to occur below 0.5V vs. Na/Na$^+$. The behavior of SnS$_2$ can be compared. Cyclic voltammograms of rGO-SnS-300 vs. Na/Na$^+$ is shown in FIG. 20. During initial discharge, a current peak at about 0.4V is observed. This initial reduction peak is at a lower potential than the main peak in subsequent cycles, suggesting that there is an activation step during first cycle. Interestingly, the main reaction peaks between SnS$_2$ and Na are the redox pair of 0.64V and 1.14V vs. Na/Na$^+$. This potential is too high for the alloying reaction between Na and Sn, and therefore must be due to reaction between SnS$_2$ and Na. The reaction peaks for Sn/Na alloying below 0.5V are small, suggesting that alloying reaction is not the dominant reaction during discharge. This can also be seen from the charge-discharge curves (see FIG. 21). First discharge curve shows only one main plateau around 0.7V vs. Na/Na$^+$. In additional, initial discharge capacity is only 900 mAh g$^{-1}$, which is smaller than theoretical capacity of 1135 mAh g$^{-1}$. If we assume all the Na is incorporated into SnS$_2$, a discharge capacity of 900 mAh g$^{-1}$ would correspond to about 6-electron transfer, which would suggests lower amount of alloying (Na$_x$Sn) in the material.

Figure 22:
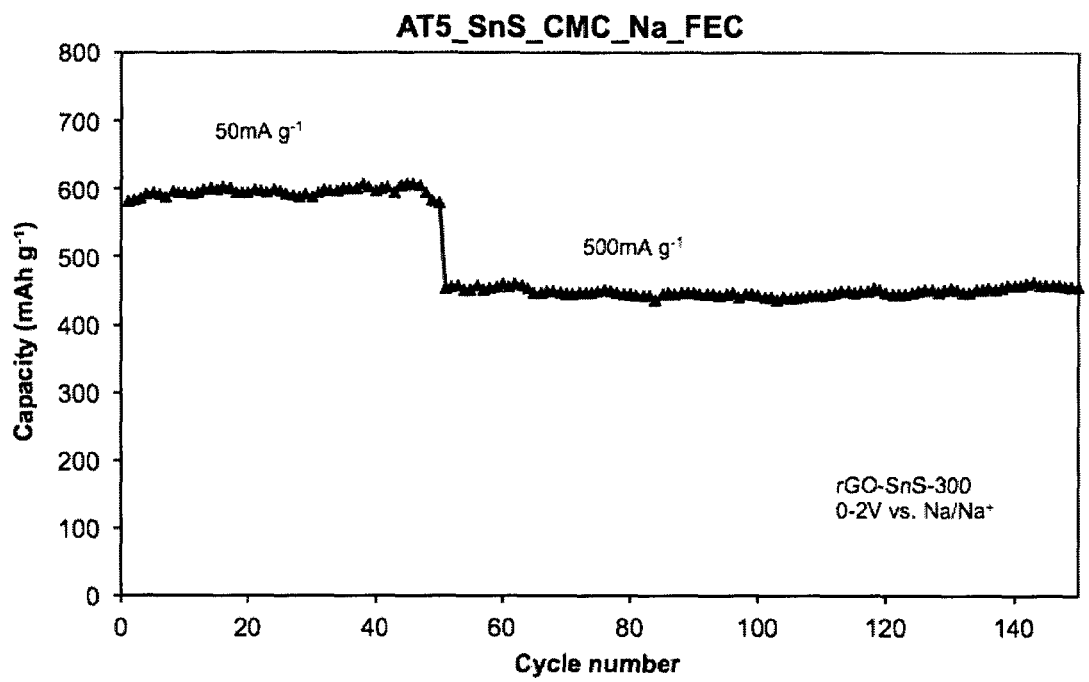
FIG. 22 shows rGO-SnS-300 stable capacity with respect to cycling as NIB.

The material shows an extremely stable capacity with respect to cycling as NIB (see FIG. 22). Charge capacity of about 600 mAh g$^{-1}$ is maintained for 50 cycles at a rate of 50 mA g$^{-1}$. Even when the rate is increased to 500 mA g$^{-1}$, a constant charge capacity of 450 mAh g$^{-1}$ is achieved for 100 more cycles.

Figure 23:
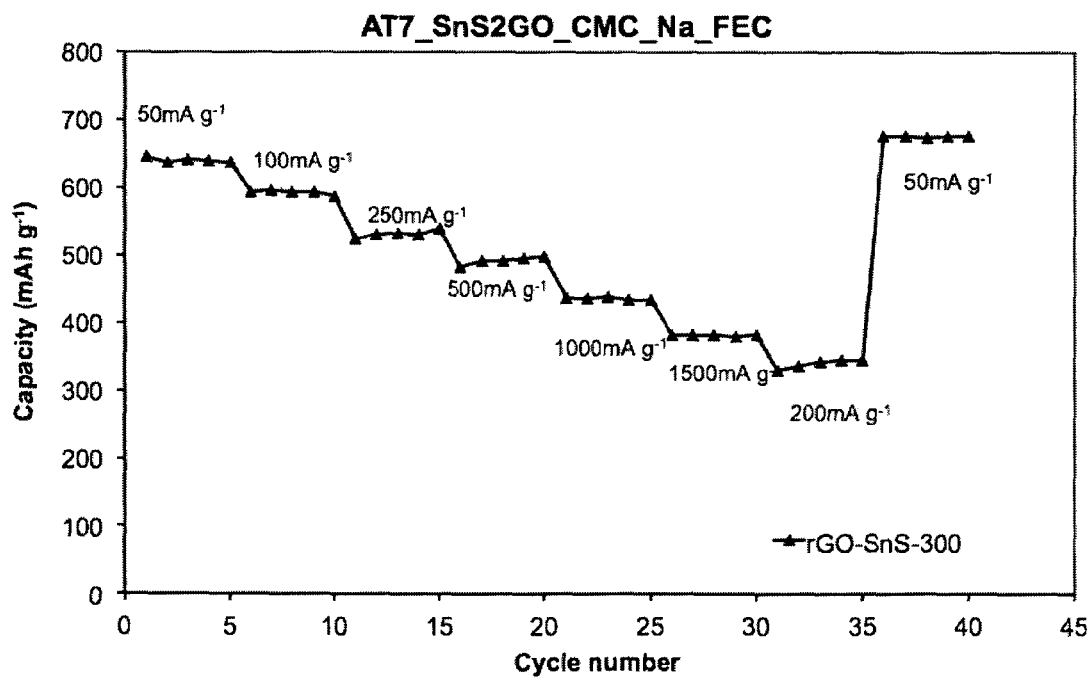
FIG. 23 shows capacity vs. cycle results of rGO-SnS-300 with Na.
Figure 24:
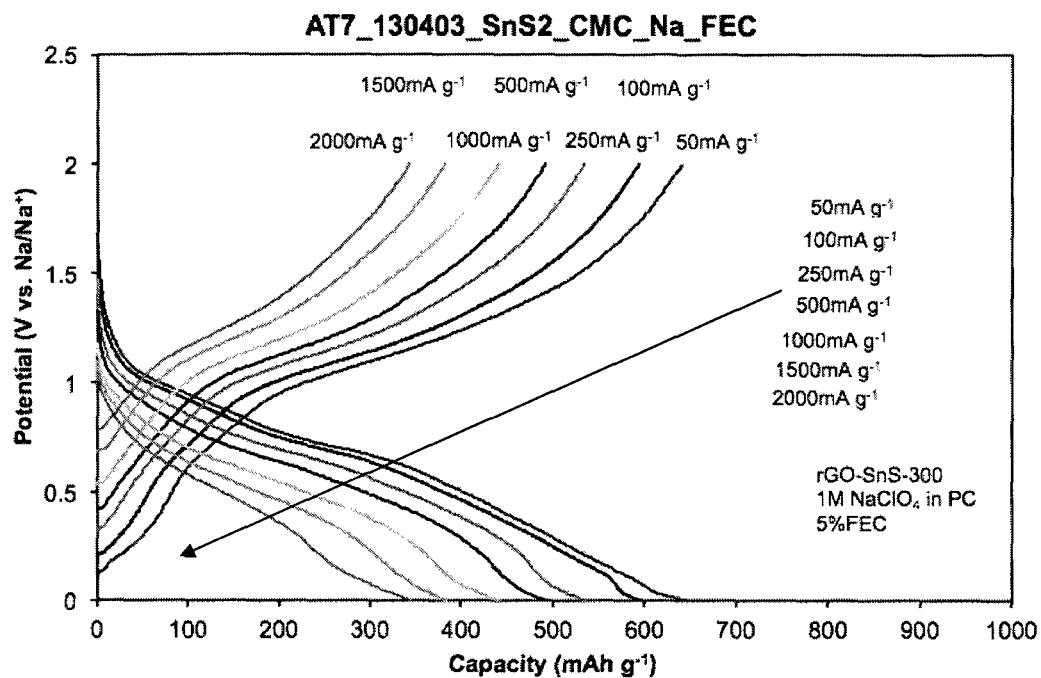
FIG. 24 charge-discharge curves of rGO-SnS-300 with Na at different current rates.

Rate performance of rGO-SnS-300 was investigated in NIB. Capacity vs. cycle results and selected charge-discharge curves at different current rates are shown in FIG. 23. The material shows good rate capability, with a charge capacity of about 340 mAh g$^{-1}$ at a rate of 2000 mA g$^{-1}$. Relative rate performance (as defined before) is 57.7% for NIB, much higher than the 39.5% for LIB. It is true that the electrolytes used for NIB and LIB are different and this may affect the rate capability of the electrodes. But we think that the difference is mainly due to different reaction mechanism of SnS$_2$ with Li and Na. Charge-discharge curves of rGO-SnS-300 with Na at different current rates are shown in FIG. 24. The difference between NIB and LIB can easily be seen when comparing the shapes of the curves.

For LIB, it is commonly understood that SnS$_2$ first undergoes conversion reaction with the formation of Li$_2$S and Sn, then followed by alloying between Li and Sn. This is evident from the two potential ranges in the charge-discharge curves. However, reaction between SnS$_2$ and Na is not clear. It was reported the formation of Na$_2$S and Na$_{15}$Sn$_4$ from ex-situ XRD study on Sn—SnS—C. The Na$_{15}$Sn$_4$ phase most likely comes from the Sn component in their material rather than from SnS$_2$, as our SnS$_2$ material shows much less contribution from alloying mechanism. Na$_2$S crystals are most likely formed, but what happens to the Sn remains unclear. Even in-situ XRD may not be able to give us sufficient information because there are no other signals from XRD. Since Na—Sn—S can co-exist as compounds such as NaSnS$_2$, Na$_4$SnS$_4$, Na$_4$Sn$_2$S$_6$, it is likely that intermediate phases with some form of Na—Sn—S are being formed during charge and discharge. So the reaction potentials of SnS$_2$ does not belong to the alloying reaction between Na and Sn (below 0.5V) or from reaction between Na and S (as in 2V of the sodium-sulfur batteries). We think that the intermediate (in the range of 1V) is crucial in enhancing the rate performance of SnS$_2$ in NIB compared to that in LIB. Further structure analysis such as NMR, Raman may be needed to identify the reaction product in the case of NIB.

In summary, the same material has shown reactivity with Na. Reversible capacity is about 600 mAh g$^{-1}$. Main reaction potential for NIB appears different from LIB. We suspect that the main reaction is from SnS/Na conversion reaction only because Sn/Na were previously shown to be at potential <0.5V vs. Na/Na$^+$. Excellent cycle stability is achieved and is stable after 150 cycles. Good rate performance having capacity=340 mAh g$^{-1}$ at 2000 mA g$^{-1}$ can be obtained. Rate performance (in terms of percentage) appears better for NIB.

Example 4

Preparation of Mixed Antimony and Tin Sulfide Coated Graphene Oxide

In this example, a mixture of antimony sulfide and tin sulfide coated graphene oxide is formed.

Experimental Section

Hydroxostannate solution preparation. 10 ml of SnCl (0.086 mol) was dissolved in few ml of water and neutralized with ammonia until pH 7. The precipitate was washed several times with water and dissolved in 31 ml of 25% tetramethylammonium hydroxide (0.086 mol) under moderate heating (the dissolution process takes approximately 30 min). After full dissolution, water was added to achieve 1.4M tin concentration.

Hydroxoantimonate solution preparation. 10 ml of SbCl$_5$ (0.078 mol) was dissolved in a few ml water and neutralized with ammonia until pH 7. The precipitate was washed several times with water and dissolved in 28.5 ml of 25% tetramethylammonium hydroxide (0.078 mol) under moderate heating (dissolution process takes approximately 4 h). After full dissolution, water was added to achieve 1.4M antimony concentration.

Peroxy precursor preparation. 1.6 mL of hydroxostannate and 1.6 mL of hydroxoantimonate solutions were mixed together in 10 mL of hydrogen peroxide (30%) with addition of 5 mL of water (final hydrogen peroxide concentration was 20% according to permanganatometric titration). This equimolar ratio of tin and antimony is used to prepare coating with molar ratio Sn/Sb=1. Resulting molar ratio Sn/Sb in coating represents the same ratio in the precursor solution.

Coating procedure. Typically, 5.0 g of aqueous GO dispersion (2% wt.) were dispersed in 15 mL of hydrogen peroxide (20%) by sonication. Then, all volume of peroxy precursor solution were added and after additional 10 min of stirring, precipitation of precursor onto the graphene oxide surface was accomplished by addition of 300 mL 1:1 mixture of ethanol and diethyl ether. The coated material was washed with ethanol-ether solution and dried under vacuum at room temperature. The coated material was stored in a 4° C. refrigerator.

Sulfidization. The sulfurization was performed by hydrogen sulfide treatment as described for GO-Sb$_2$S$_3$ in Example 1. Heat treatment may be applied thereafter to attain crystallization and complete the sulfidization step.

Example 5

Preparation of Lithium and Sodium Doped Tin and Antimony Sulfide Coated Graphene Oxide In this example, the metal sulfide of the composite is doped with lithium or sodium.

Preparation of lithium peroxostannate supported GO. 0.309 g of powder Li$_2$Sn(OH)$_6$·2H$_2$O were dissolved in 10 ml of hydrogen peroxide (20%). Then, 2.3 g of aqueous GO dispersion (1.5%) were added and dispersed by sonication. Precipitation of lithium peroxostannate onto the GO surface was accomplished by addition of 150 mL ethanol. The coated GO was washed with the ethanol and ether and dried under vacuum at room temperature. Coated material was stored in a 4° C. refrigerator.

Lithium and TMA peroxostannate (3:10) supported GO. 0.15 g of powder Li$_2$Sn(OH)$_6$ were dissolved in 10 ml of hydrogen peroxide (20%). Then, 5.6 g of aqueous GO dispersion (1.5%) and 1.7 mL TMA hydroxostannate solution (1.4 M) were added and dispersed by sonication. Precipitation of lithium peroxostannate and TMA peroxostannate onto the GO surface was accomplished by addition of 150 mL ethanol. The coated GO was washed with the ethanol and ether and dried under vacuum at room temperature. Coated material was stored in a 4° C. refrigerator.

Preparation of Sodium hydroxostannate precursor solutions. 3 mL of SnCl4 (0.019 mol) was dissolved in several mL of DIW and neutralized with ammonia until pH 7. The precipitate was washed several times with DIW and dissolved in 30 mL of 3M aqueous sodium hydroxide (0.09 mol) under moderate heating (the dissolution process takes approximately 4 h). After full dissolution, DIW was added to achieve 1.4 M tin concentration.

Sodium Peroxostannate supported GO. Typically, 3.8 g of aqueous GO dispersion (1.5% wt.) were dispersed in 30 mL of hydrogen peroxide (20%) by sonication. Then, 1 mL of sodium hydroxostannate solution (1.4 M) was added. Precipitation of peroxostannate onto the GO surface was accomplished by addition of 300 mL ethanol. The coated GO was washed with the ethanol and dried under vacuum at room temperature. The coated material was stored in a 4° C. refrigerator.

In all cases, the coated material may thereafter be heat-treated to destroy the peroxide and to obtain crystallinity and conductivity.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. A method for forming a reduced grapheme oxide/metal sulfide composite, comprising:
   adding a dispersion comprising graphene oxide to hydrogen peroxide solution;
   adding one or more metal complex or salt solution to the dispersion;
   precipitating one or more peroxide-rich sol onto the graphene oxide surface to form one or more peroxide rich-metal oxide precursor-supported grapheme oxide;
   treating the supported graphene oxide with a sulfur source;
   heating the treated supported graphene oxide at a first temperature to form a powder; and
   heating the powder at a second temperature to form the reduced graphene oxide/metal sulfide composite,
   wherein adding one or more metal complex or salt solution to the dispersion futher comprises adding one or more doping metal precursor to the dispersion and wherein the metal of the one or more doping metal precursor is lithium or sodium.

2. The method of claim 1, wherein precipitating comprises adding an antisolvent to the dispersion.

3. The method of claim 2, wherein treating the supported graphene oxide with a sulfur source comprises bubbling hydrogen sulfide through an alcohol suspension.

4. The method of claim 1, wherein the first temperature is about 60° C. to about 100° C.

5. The method of claim 4, wherein the first temperature is about 80° C.

6. The method of claim 1, wherein the second temperature is about 200° C. to about 500° C.

7. The method of claim 6, wherein the second temperature is about 300° C.

8. The method of claim 1, wherein at least one of the heating of the treated supported graphene oxide and the heating of the powder is carried out in vacuum.

9. The method of claim 1, wherein the one or more metal complex or salt solution is hydroxoantimonate solution, hydroxostannate solution, hydroxogermanate solution, hydroxozincate solution, or a mixture thereof.

10. The method of claim 1, wherein the metal sulfide is $MS_x$, wherein M is a metal selected from the group consisting of Ge, Sn, Zn, Sb, Zn, and In, and $1 \leq x \leq 3$.

11. The method of claim 1, wherein the metal sulfide is antimony (III) sulfide ($Sb_2S_3$), antimony (V) sulfide ($Sb_2S_5$), tin (II) sulfide (SnS), tin (IV) sulfide ($SnS_2$), zinc sulfide (ZnS), germanium (II) sulfide (GeS), tin (IV) sulfide ($GeS_2$), indium (III) sulfide ($In_2S_3$) or a mixture thereof.

12. The method of claim 11, wherein the metal sulfide is $Sb_2S_3$ or $SnS_2$.

* * * * *

UNITED STATES PATENT AND TRADEMARK OFFICE
CERTIFICATE OF CORRECTION

PATENT NO. : 9,755,227 B2  
APPLICATION NO. : 14/646261  
DATED : September 5, 2017  
INVENTOR(S) : Yau Wai Denis Yu et al.

Page 1 of 1

It is certified that error appears in the above-identified patent and that said Letters Patent is hereby corrected as shown below:

In the Claims

Column 23, Line 16:
"1. A method for forming a reduced grapheme oxide/metal" should read, --1. A method for forming a reduced graphene oxide/metal--.

Column 23, Line 24:
"rich-metal oxide precursor-supported grapheme oxide;" should read, --rich-metal oxide precursor-supported graphene oxide;--.

Column 24, Line 29:
""(ZnS), germanium (II) sulfide(GeS), tin (IV) sulfide (GeS$_2$)," should read, --(ZnS), germanium (II) sulfide (GeS), germanium (IV) sulfide (GeS$_2$),--.

Signed and Sealed this  
Thirteenth Day of March, 2018

Andrei Iancu  
*Director of the United States Patent and Trademark Office*